United States Patent [19]

Reams et al.

[11] Patent Number: 5,051,920

[45] Date of Patent: Sep. 24, 1991

[54] FLOW-METER DATA COLLECTION AND PROCESSING SYSTEM

[75] Inventors: Barry A. Reams, Schaumburg; Lyle W. Clem, Algonquin, both of Ill.

[73] Assignee: Accurate Metering Systems, Inc., Schaumburg, Ill.

[21] Appl. No.: 389,840

[22] Filed: Aug. 4, 1989

[51] Int. Cl.$^5$ .............................................. G06F 15/20
[52] U.S. Cl. ..................................... 364/509; 364/465
[58] Field of Search ..................... 364/510, 509, 465; 73/863.01, 864.34

[56] References Cited

U.S. PATENT DOCUMENTS

| | | | |
|---|---|---|---|
| 4,258,421 | 3/1981 | Juhasz et al. | 364/424.04 |
| 4,313,168 | 1/1982 | Stephens et al. | 364/510 |
| 4,482,964 | 11/1984 | Berstein et al. | 364/465 |
| 4,617,827 | 10/1986 | Gronke | 73/200 |
| 4,803,887 | 2/1989 | Sanden et al. | 73/863.01 |
| 4,858,856 | 8/1989 | Hanway | 364/424.04 |

Primary Examiner—Parshotam S. Lall
Assistant Examiner—Ellis B. Ramirez
Attorney, Agent, or Firm—Thomas R. Vigil

[57] ABSTRACT

The flow-meter data collection and processing system includes: a flow meter; a hose coupled to the flow meter for supplying liquid to said flow meter; electrical circuitry coupled to the flow meter for operating the flow meter, and control circuitry for controlling the electrical circuitry. The control circuitry includes a processor, a coded actuating device such as a memory key for controlling actuation of the processor and data collection memory for collecting flow meter data, operator data and operator inputted data.

The system also includes a processor adapted to be coupled to the data collection memory for collecting data and supplying such data to a data processor (a PC) for analyzing and collating data retrieved from the data collection memory.

25 Claims, 29 Drawing Sheets

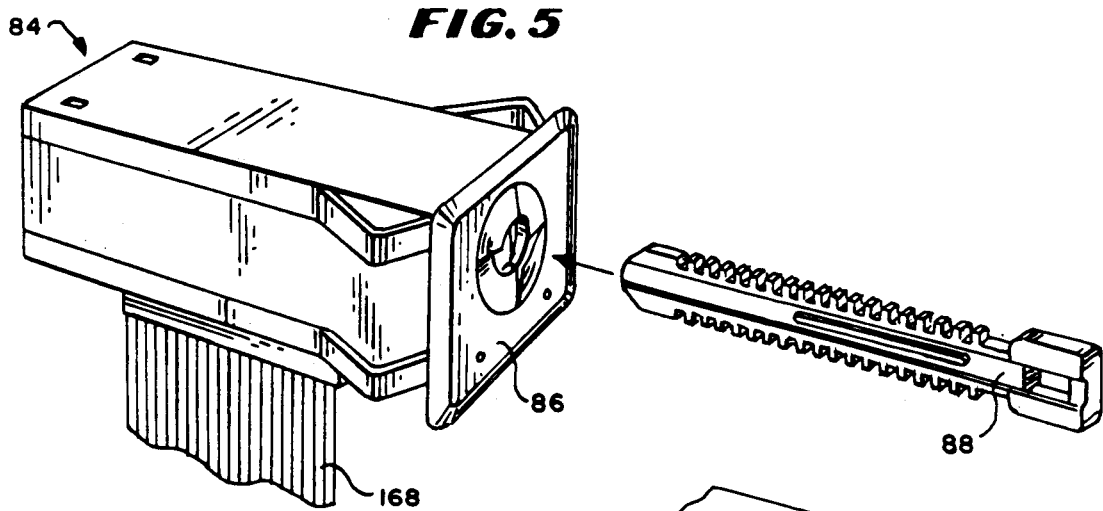
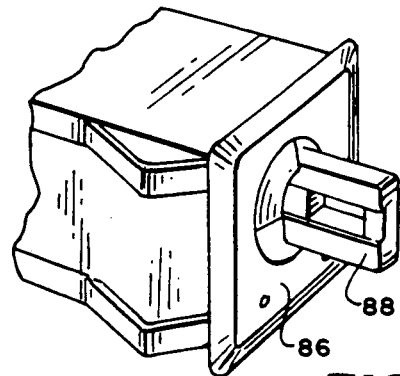
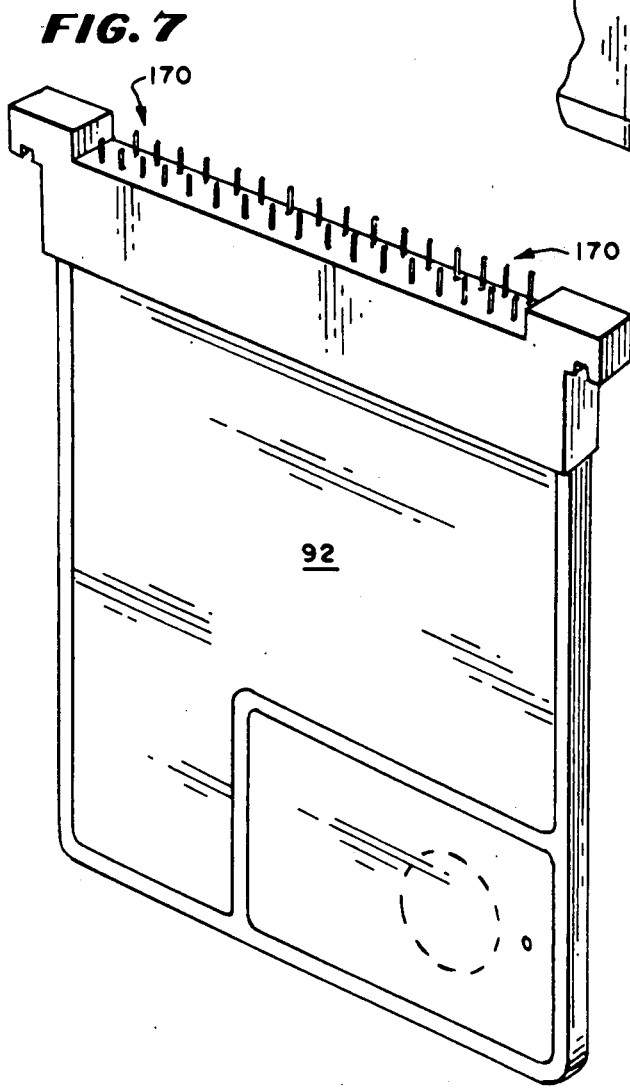

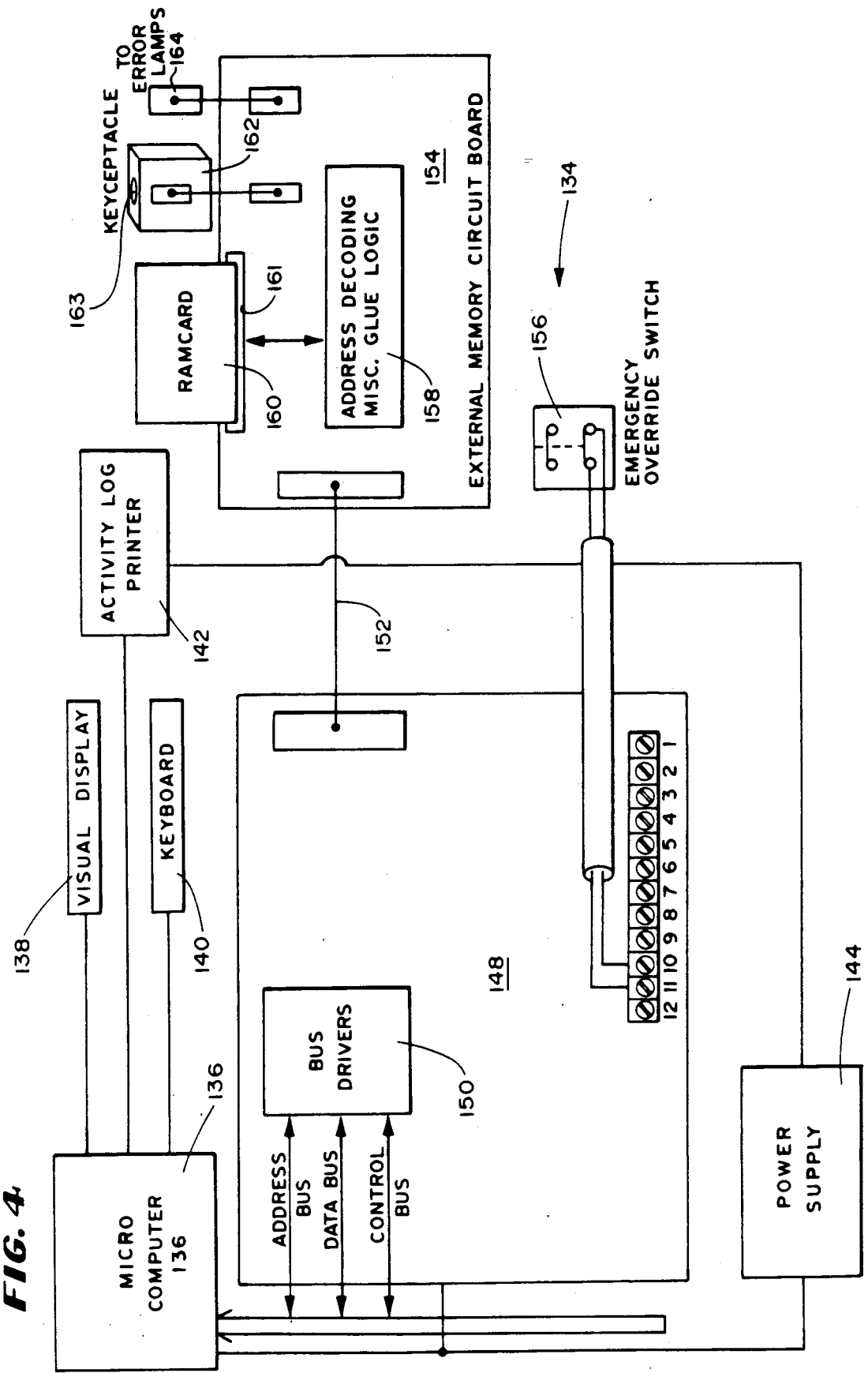

VARIABLE OPLEVEL:
1 = JUST STARTING, WAITING ON DRIVER INFO.
2 = HAVE DRIVER INFO, WAITING TO BEGIN A PICKUP.
3 = HAVE PRODUCER INFO, WAITING TO RECEIVE MILK.
4 = RECEIVING MILK, NOT YET DONE.
5 = DONE RECEIVING MILK, BUT DATA NOT STORED AND TICKET NOT PRINTED.
6 = DATA STORED, BUT TICKET(S) NOT PRINTED.
7 = EVERYTHING COMPLETE.

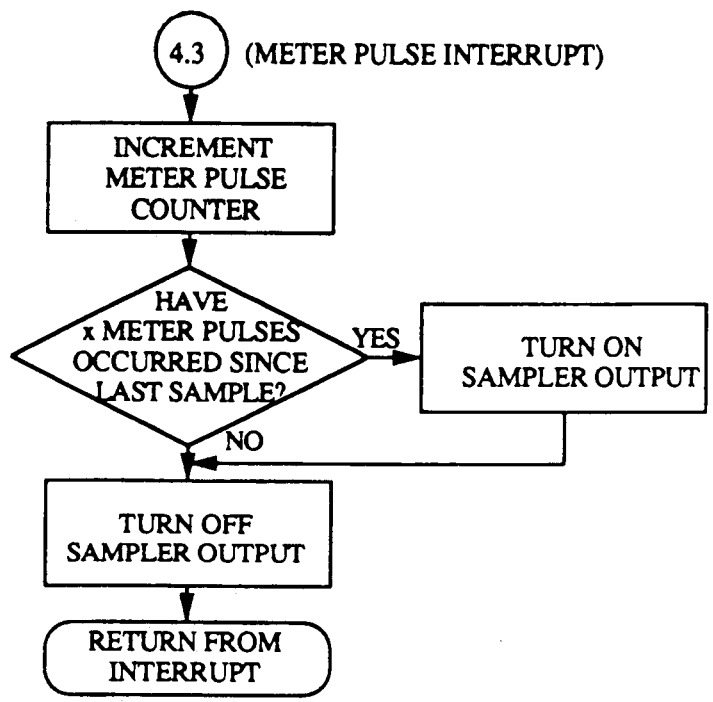
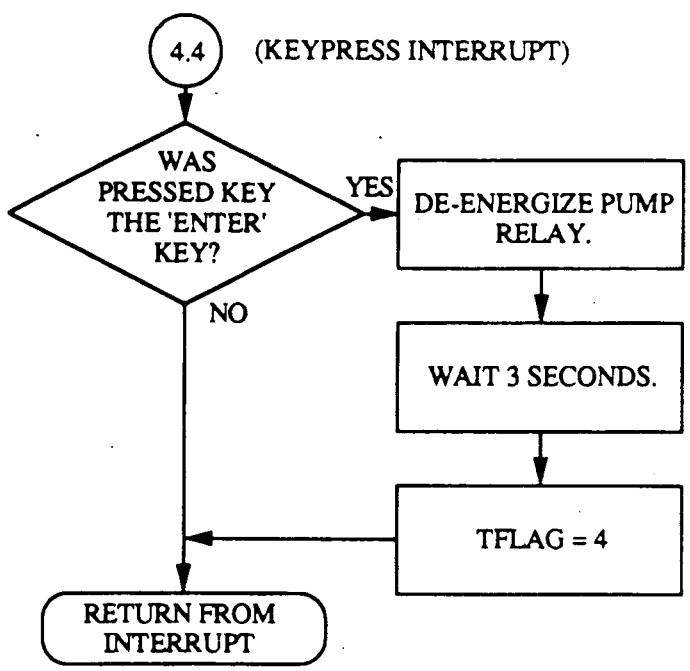
FIG. 18

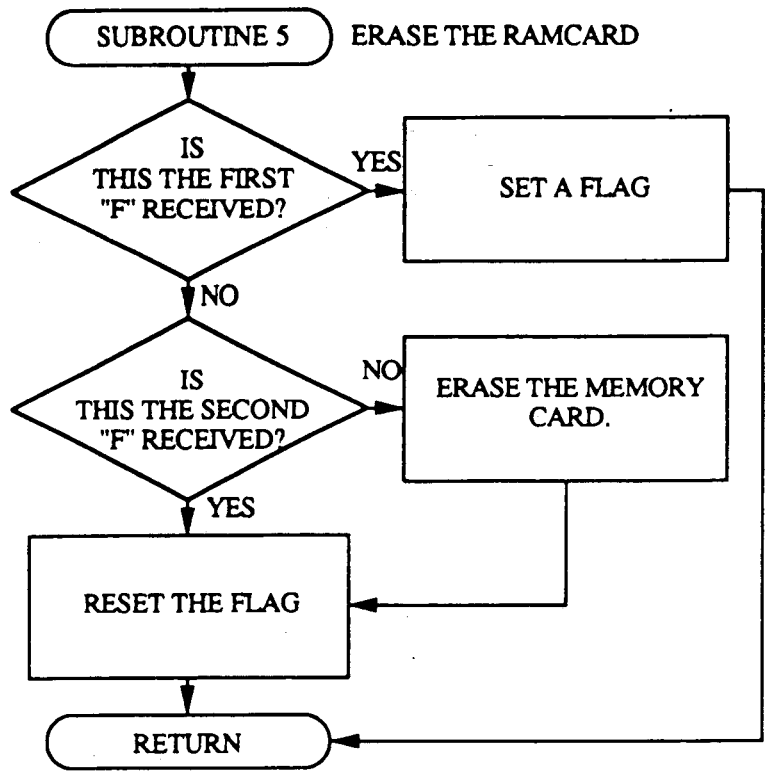
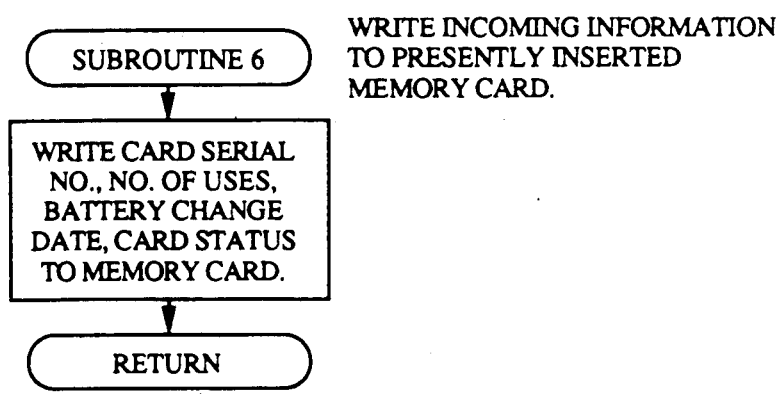
FIG. 25

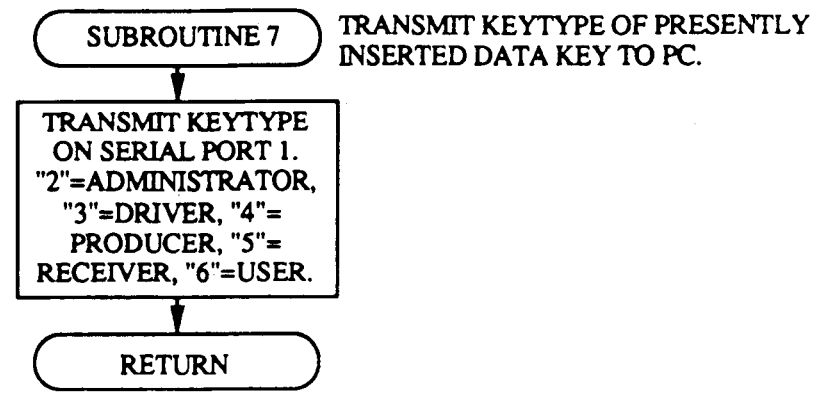
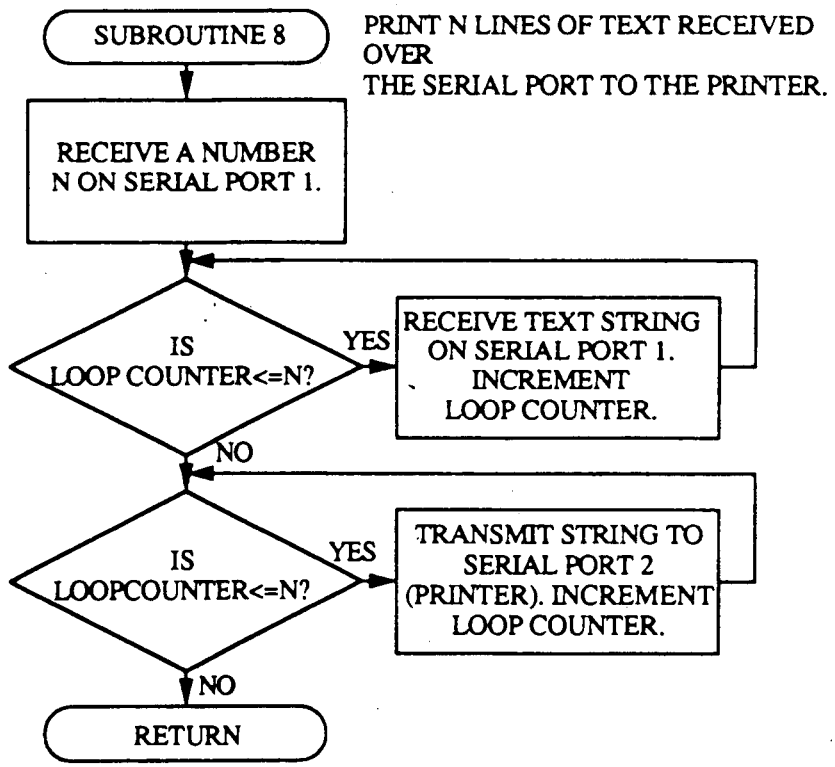
FIG. 26

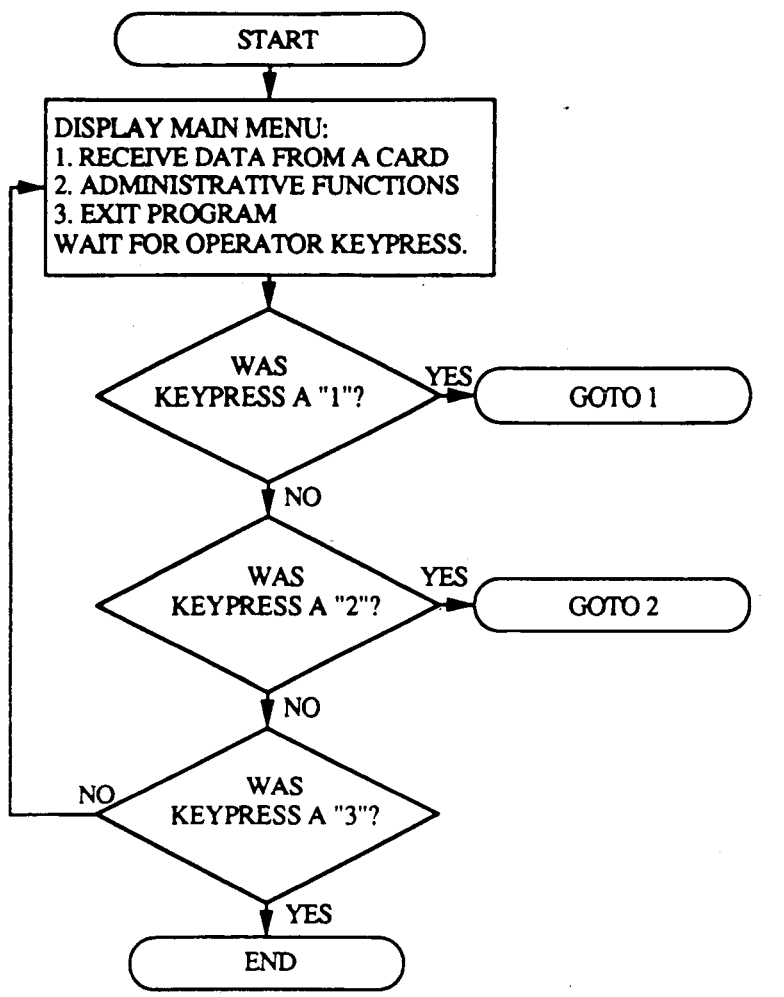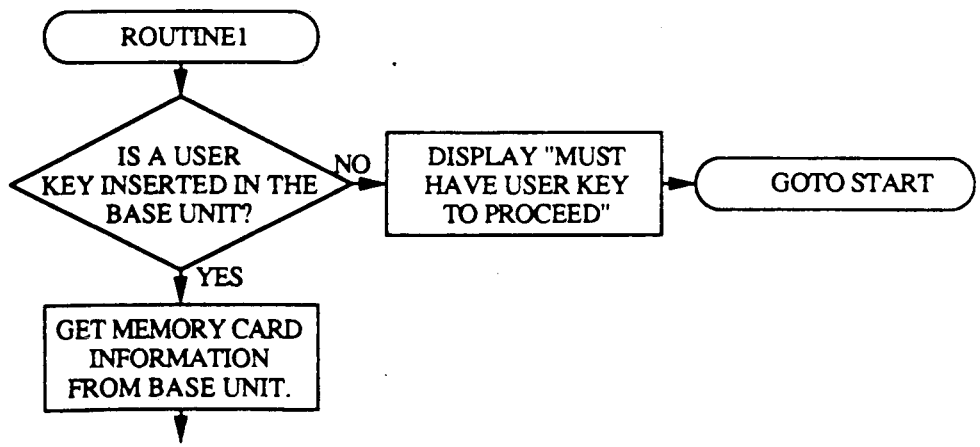
FIG. 27

FLOW-METER DATA COLLECTION AND PROCESSING SYSTEM

BACKGROUND OF THE INVENTION

1. Field of the Invention:

The present invention relates to a flow-meter data collection and processing system which is adapted to be utilized with a trailer truck with a portion of the system being mounted in a compartment at the rear of the trailer tank truck.

2. Description of the Prior Art:

Heretofore, a trailer tank truck for picking up liquid from a number of different sites, such as a milk truck for picking up milk from various farmers, had a small compartment at the rear of the trailer tank truck in which was mounted a pump, a motor for the pump and a hose adapted to be connected to the farmers bulk cooler.

The amount of milk delivered to the tank truck was determined by first inserting a measuring stick into the milk cooler to determine the level of the milk in the cooler, then an operator would pump the milk out of the bulk tank cooler into the tank truck and proceed to the next bulk tank cooler and make a similar measurement.

The height of the milk in the milk cooler was directly related to the number of gallons in the bulk milk cooler. In this respect, the measuring stick was calibrating in gallons per unit height of the milk cooler.

This technique works satisfactorily but was cumbersome and awkward. In this respect, a clean measuring stick had to be available and the quantity of milk in each milk cooler had to be measured and entered on a log. Then all entries on the log for each of the farmers had to be added up to determine the amount of milk received from all the farmers.

One improvement to such a flow-metering system for a milk-collecting vehicle is disclosed in U.S. Pat. No. 4,803,887 which teaches a method of sampling and an associated sampling apparatus which collects individual aliquot amounts of milk based upon the calculated number of meter pulses between sample intervals.

The method and apparatus disclosed in this patent for carrying out the sampling includes a computer that receives a signal from a flow meter which has access to and from a memory. The computer takes input from a magnetic-type card reader and provides an output signal to a sampling device.

Also there has been proposed in pending U.S. application Ser. No. 237,057 filed Aug. 29, 1988 for "METERING ASSEMBLY FOR TANK TRUCK/TRAILER," a system where the motor in the compartment is energized by a control circuit which is coupled to a frequency scaling board. The frequency scaling board is also connected to a printer and to a flow-meter. With this arrangement, the amount of milk pumped and sent to the flow-meter can be calculated by the frequency of the scaling board, which at the same time controls the operation of the motor. When the pumping is finished, the frequency scaling board can tell the printer how much milk has been pumped from the farmer's milk flow cooler into the tank truck/trailer so that a printed receipt from the printer can be supplied to the farmer.

As will be described in greater detail hereinafter, the flow-meter data collection data processing system of the present invention differs from the prior art systems described above by providing removable data cassettes which are utilized to collect data in an on-board processor forming part of the system.

Also, the system of the present invention differs from the prior art systems described above by utilizing two processors, one is an on-board unit, and the other is an off-board or base unit which is connectable to a "personal computer" which can manipulate the collected data utilizing well-developed software, such as data management software sold under the trademark D Base or D Base III+.

The data collection and processing system can also be used as a "custody transfer control system" for a trailer tank truck which carries a supply of liquid from one location to another, such as from a storage center to a plurality of establishments having soda fountains.

Further, as will be described in greater detail hereinafter, the flow-meter data collection and processing system can include temperature monitoring systems, heater mechanisms to maintain a desired environment, and a self-contained input/output structure which provides start/stop functions of truck-based pumps and reading of operator input devices such as an associated keyboard or keypad.

SUMMARY OF THE INVENTION

According to the invention there is provided a flow-meter data collection and processing system for use in the collection of liquid at different times and/or locations including: a flow meter; means coupled to said flow meter for supplying liquid to said flow meter; electrical circuitry coupled to said flow meter for operating said flow meter; and control circuit means for controlling said electrical circuitry, said control circuit means including processing means, coded actuating means including at least one separate, detachable memory device with identification data therein for controlling actuation of said processing means and means coupled to said processing means for reading the separate, detachable memory device, and data collection means for collecting flow meter data, operator data and operator inputted data from said processing means.

Preferably, the coded actuating means includes a separate detachable memory device for each liquid supplier and, preferably, each separate detachable memory device has liquid supplier identification means therein and free memory for receiving and storing data from said processing means.

Also according to the invention there is provided a method for collecting and processing data received from a fluid pickup system using a processor system, said method including the steps of:

(a) providing processing means;

(b) identifying with a separate, detachable memory device the operator who is picking up or delivering the fluid to the processor means;

(c) identifying with a separate, detachable memory device each supplier of fluid to the processor system;

(d) determining if the fluid being picked up meets certain criteria; and (e) determining from the liquid supplier separate, detachable memory device the source of the fluid.

Preferably, the method includes the step of providing free memory in each liquid supplier, separate, detachable memory device for receiving and storing data from said processing means.

Further according to the invention there is provided an apparatus including a processor system for collecting and processing data received from a fluid pickup system using said processor system, said apparatus including:

(a) processing means;

(b) means including a separate, detachable memory device for identifying the operator, who is picking up the fluid to said processor means;

(c) means including a separate, detachable memory device for identifying each supplier of fluid to said processor means;

(d) means for receiving the memory device and for reading the identifying information in the memory device and for supplying the identifying information to the processing means;

(e) means associated with the processing means for determining if the fluid being picked up meets certain criteria; and (f) means including the processing means, the liquid supplier separate, detachable memory device and the reading means for determining the source of the fluid.

Preferably, each liquid supplier, separate, detachable memory device has free memory therein for receiving and storing data from said processing means.

Also, preferably, information regarding the volume of liquid that is just collected from a liquid supplier is stored in the free memory and, preferably, the data collection means also comprises a separate detachable memory device.

BRIEF DESCRIPTION OF THE DRAWINGS

FIG. 4 is a schematic electrical circuit diagram of an off-board programmable controller forming part of the system which is utilized in processing data obtained from the on-board programmable controller shown in FIGS. 1, 2 and 3.

FIG. 5 is a perspective view with portions broken away of an assembly of a 8 bit parallel memory, a key (an EEPROM key) and a key receptacle of the on-board programmable controller and shows the key positioned for insertion into the key receptacle of the assembly.

FIG. 6 is a perspective view with portions broken away of the assembly shown in FIG. 5 with the key received in the key receptacle.

FIG. 7 is a perspective view of a pluggable BB RAM card of the system shown schematically in FIGS. 3 and 4.

FIGS. 8-19 are a series of flow charts and sub-routines carried out by the on-board programmable controller in carrying out its program functions.

FIGS. 20-26 are flow charts and sub-routines of the operational functions and associated sub-routines carried out by the off-board programmable controller.

FIGS. 27-31 are flow charts of the programs and associated sub-routines utilized in interfacing the on-board programmable controller with the off-board processing programmable controller and which are utilized by a "personal computer" for assimilating the collected flow-meter data into file formats using software such as that sold under the trademark d BASE (I, II, III, III+ or IV).

DESCRIPTION OF THE PREFERRED EMBODIMENT

Figure 1:
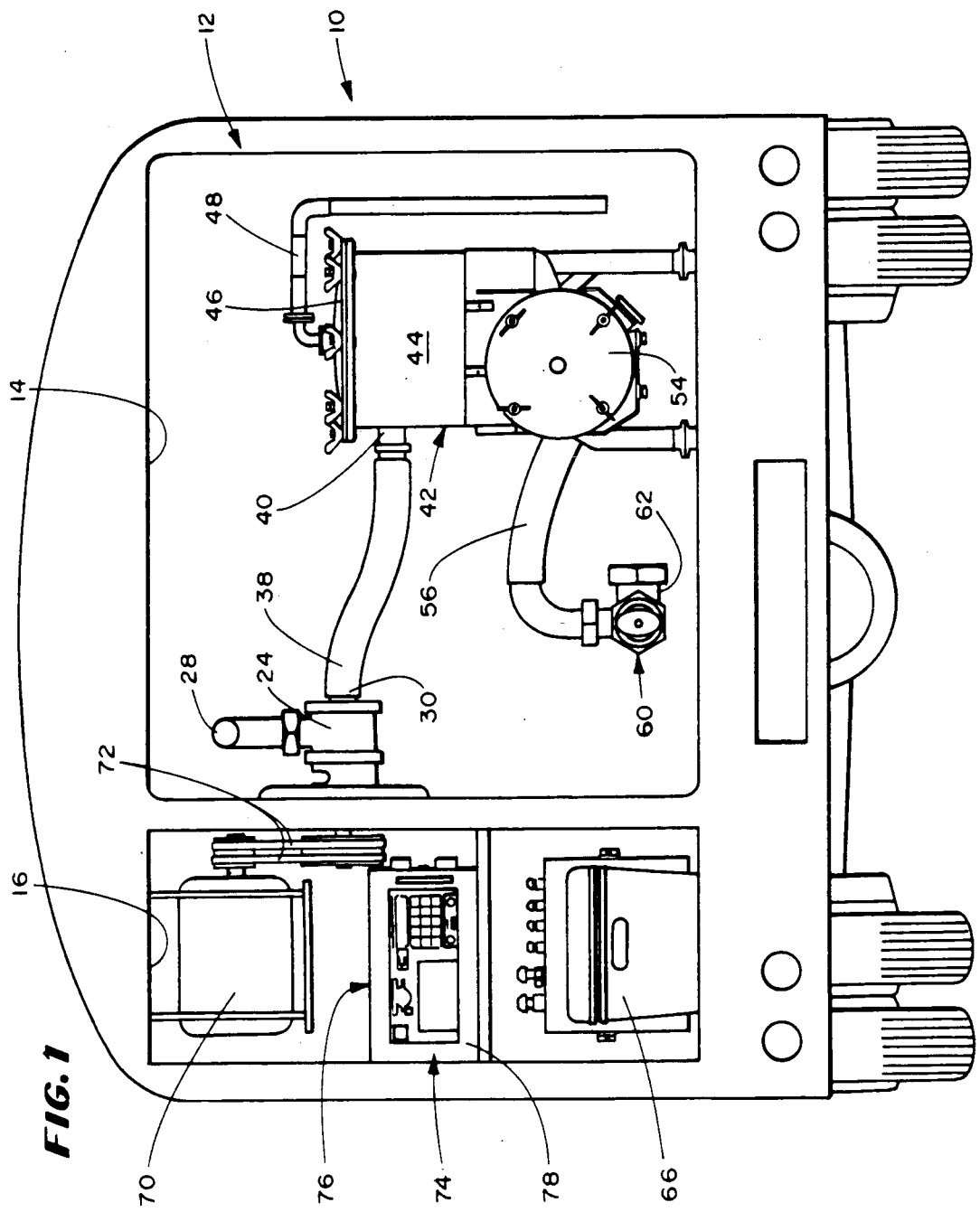
FIG. 1 is a back elevational view of a tank truck with the back panels or doors thereof removed to show a typical arrangement of the mechanical and electrical components of the flow-meter data collection and processing system of the present invention.

Referring now to the drawings in greater detail, there is illustrated in FIG. 1 a rear end of a trailer tank truck 10, and in particular, a compartment 12 located at the rear end of the truck 10. The compartment 12 in the truck 10 is divided into two sub-compartments 14, 16 by a partition wall 18. These compartments 14, 16 are normally closed by a pair of swinging doors (not shown). In the open position of the doors (not shown), access can be had to the compartments 14, 16.

Mounted in compartment 14 on the partition wall 18 is a pump 24 having an inlet end 28. It will be understood, that although not shown, a flexible hose is adapted to be connected to the inlet end 28 and such hose has at its distal end a nozzle (not shown) adapted to be inserted into a receptacle containing liquid such as into a farmer's bulk tank cooler.

The flexible hose and nozzle are adapted to be coiled when not in use and stored in the compartment 14.

In use, the hose and nozzle (not shown) are connected to the farmer's milk bulk cooler tank and the pump 24 is then operated to pump milk from the farmer's bulk tank cooler into the tank truck 10.

As shown, an outlet end 30 of the pump 24 is connected by a hose 38 to an upper inlet 40 of an air eliminator vessel 42 which includes a hollow generally cylindrical body 44 having a cover 46, a vent tube 48 extending from the cover 46 and an outlet hidden from view.

The outlet from the air eliminator vessel 42 is typically connected through a strainer assembly (not shown) to a flow-meter 54. An outlet (not shown) of the flow-meter 54 is connected by a hose 56 through a valve 58 mounted on a back wall 60 of the compartment 14 to an inlet (not shown) of the tank of the tank truck 10. The valve 58 has an outlet 62 through which collected milk can be delivered to a milk processing plant.

A temperature sensing probe 64 known as a resistance temperature device (RTD) and which is hidden from view in FIG. 1, (64 in FIG. 3) and a sample collection bottle (not shown), also hidden from view in FIG. 1, are connected to a pipe or conduit hidden from view in FIG. 1 and situated between the air inlet vessel 42 and the flow-meter 54. The temperature sensing probe 64 is utilized to determine the temperature of the milk being collected. The sample collection bottle is utilized to collect a sample of the milk being collected and such sample bottles are stored in a cooler 66 mount the compartment 16.

In the compartment 16 is located a motor 70 for driving the pump 24. The motor 70 is coupled to the pump 24 by belts 72. Operation of the motor 70 is controlled by an on-board programmable controller/processor 74 located in the compartment 16. The processor 74 has connections (not shown) to the flow-meter 54 for collecting data therefrom and forms part of the flow-meter data collection and processing system of the present invention.

The processor 74 is mounted in a stainless steel cabinet 76 which is provided with a latch through which a wire and seal, such as a lead type seal, can be inserted to ensure the security of the processor 74.

Figure 2:
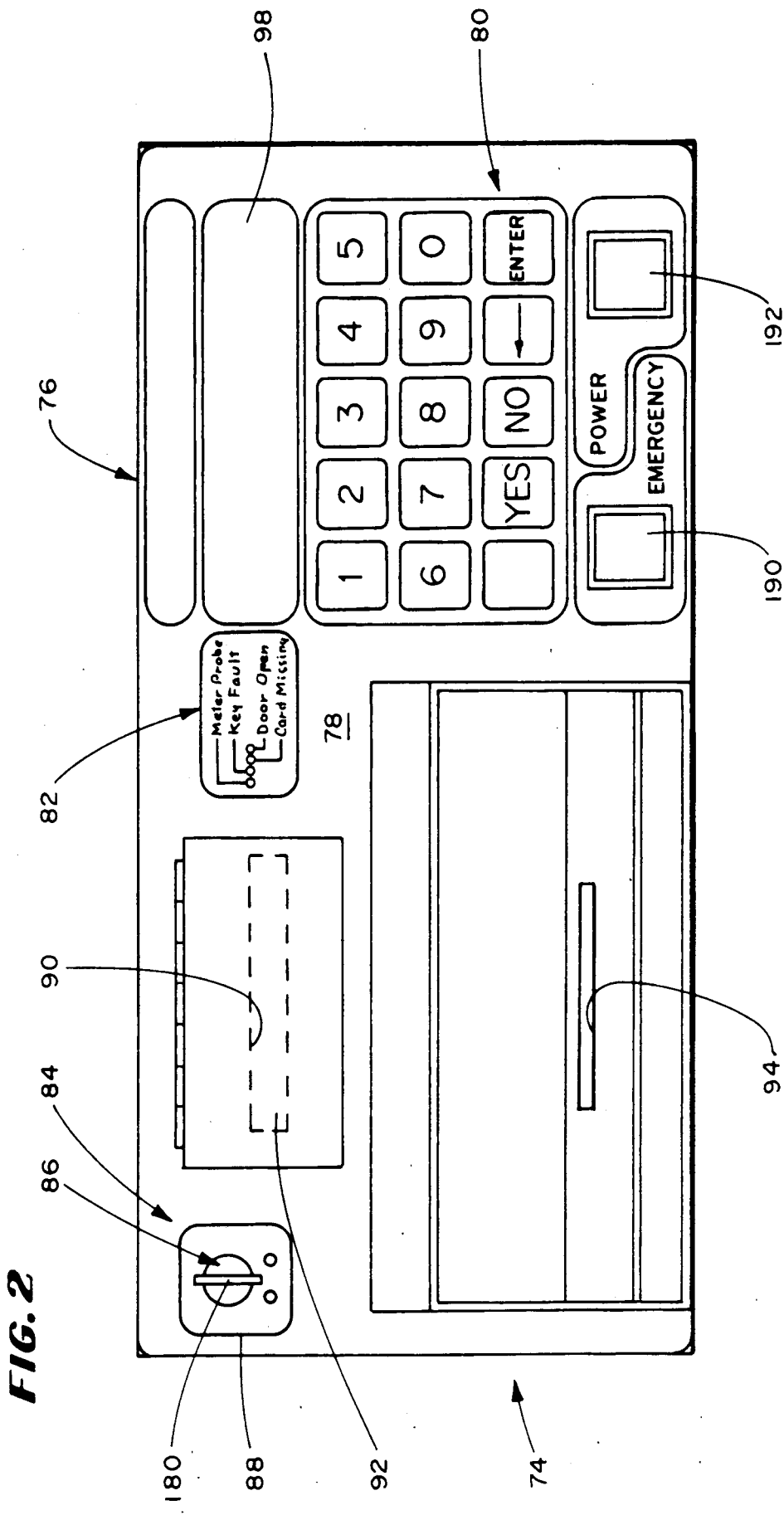
FIG. 2 is an enlarged front view of an on-board programmable controller of the flow-meter data collection and processing system.

In FIG. 2 there is illustrated a front panel 78 of the cabinet 76 on which are mounted components of the processor 74 such as a keyboard or keypad 80 having the keys shown, a group 82 of indicator lamps or LEDs to indicate various conditions of the processor 74 and of the tank truck 10; a key receptacle and key assembly 84 including a key receptacle 86 and an EEPROM key 88, a slot 90 for receiving a pluggable battery backed RAM card 92 on which is stored data according to the teachings of the present invention, a slot 94 for delivering a printout, such as a receipt, from a printer 96 (FIG. 3) hidden from view in FIGS. 1 and 2, and a visual display 98. Inside the cabinet 76 is a temperature sensor 100 (FIG. 3) and a heater 102 (FIG. 3) for maintaining the temperature of the processor 74 above a minimum set point temperature. Also mounted on the panel 78 is a coded override switch 104.

Figure 3:
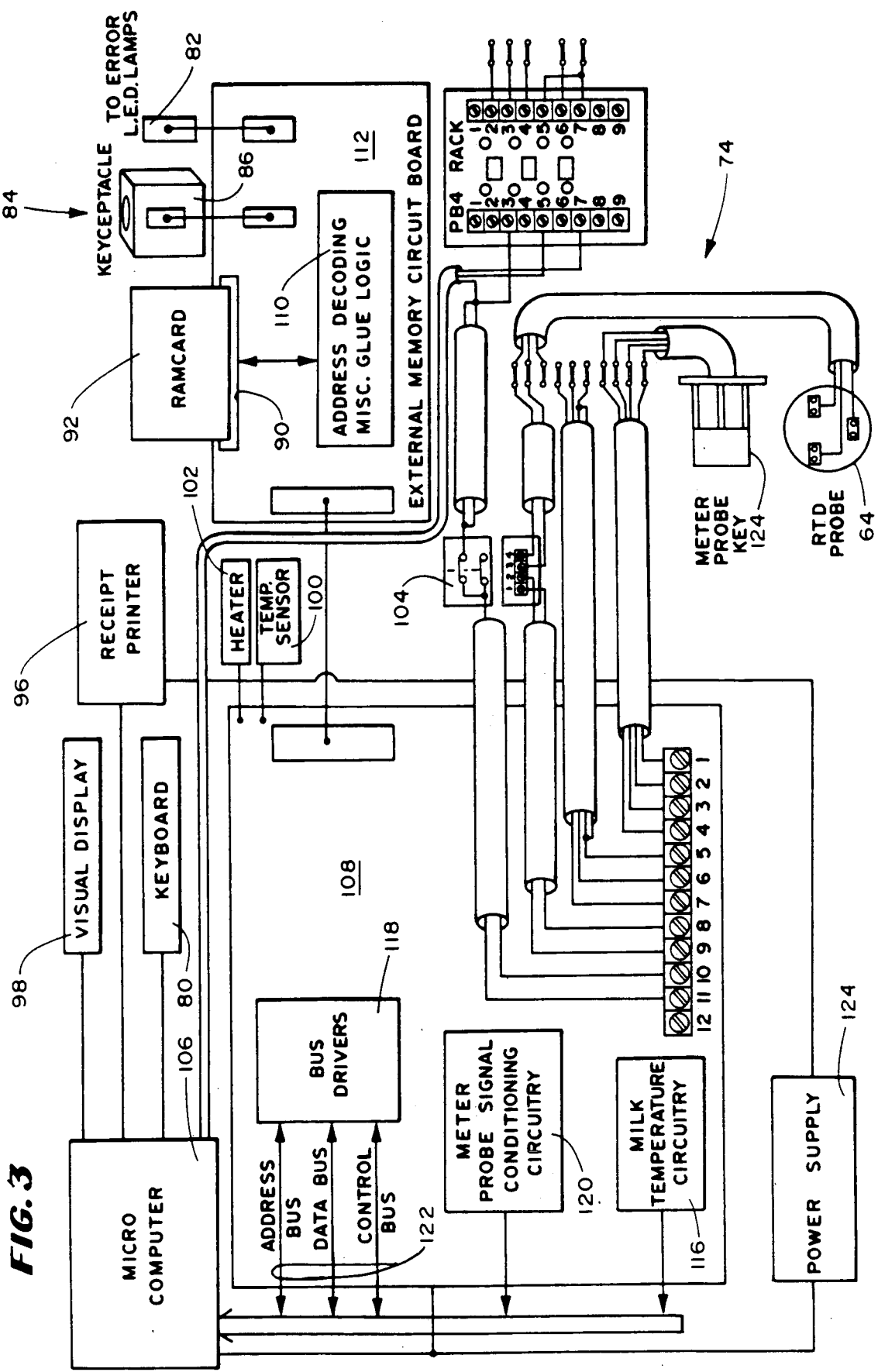
FIG. 3 is a schematic electrical circuit diagram of the on-board programmable controller of the system showing FIG. 2 mounted in the back of the tank truck.
Figure 8:
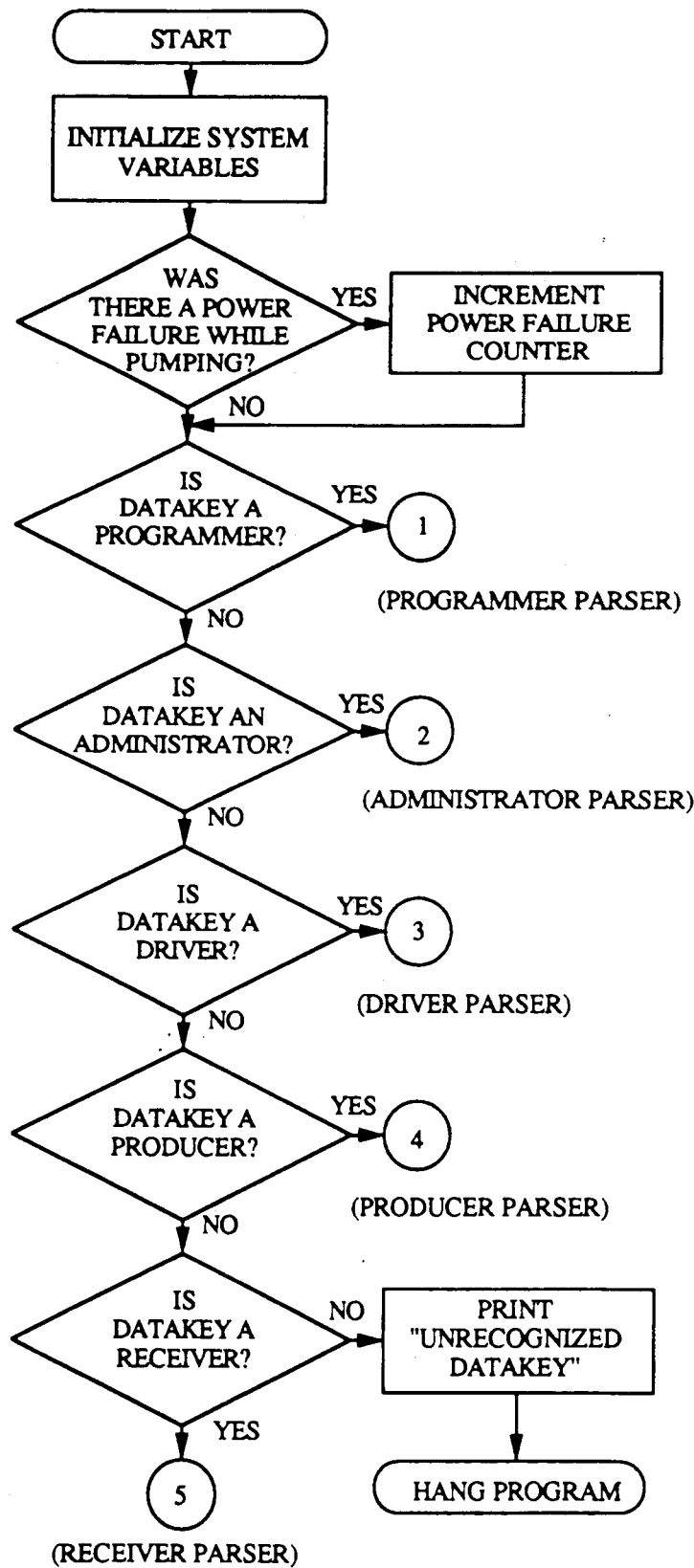
Figure 9:
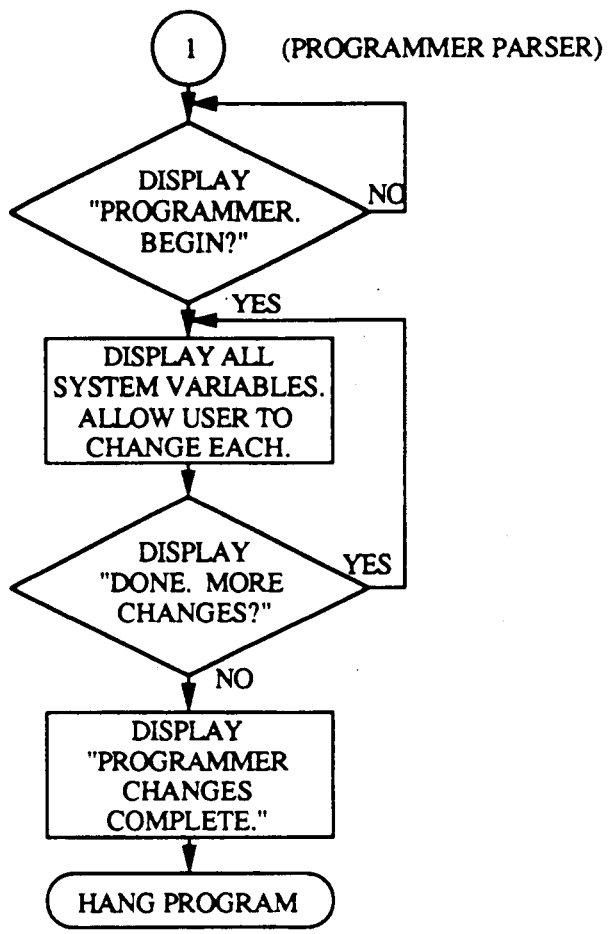
Figure 10:
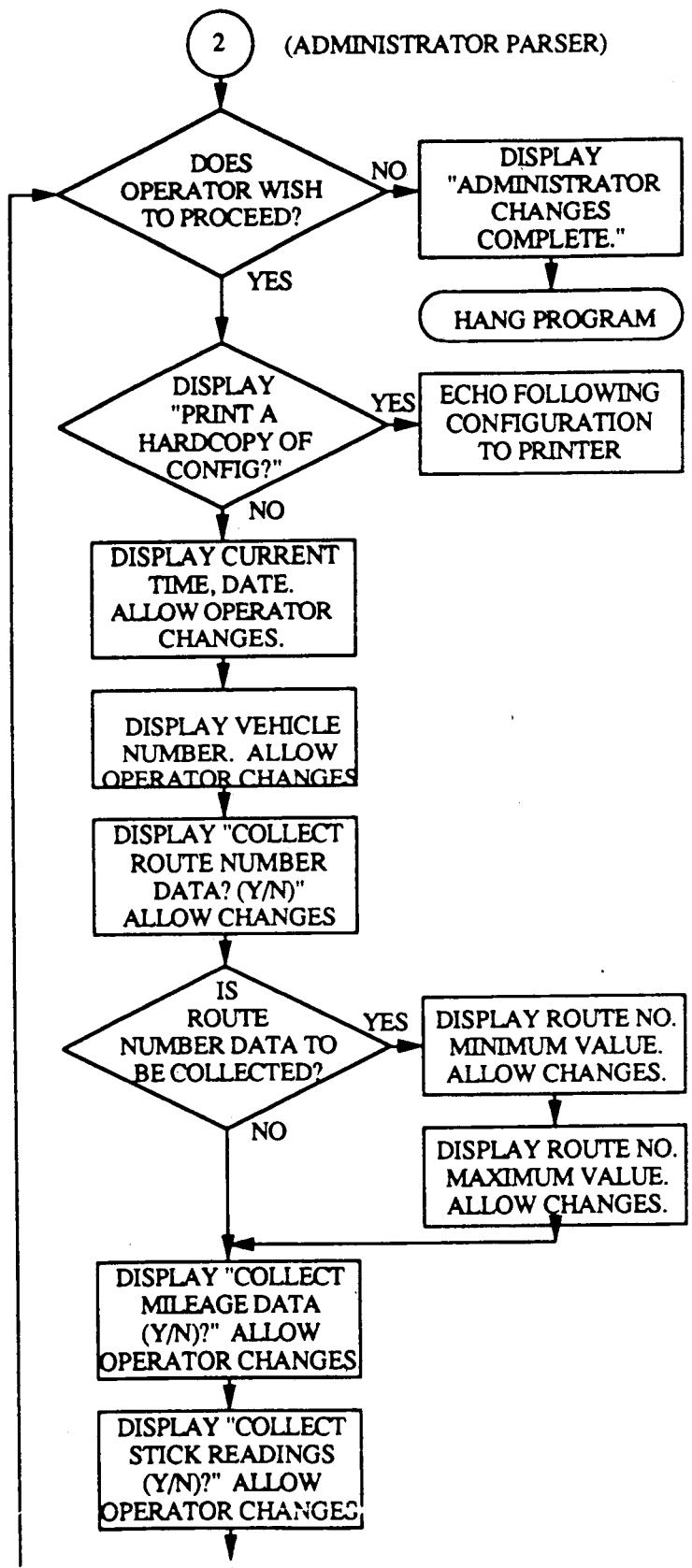
Figure 11:
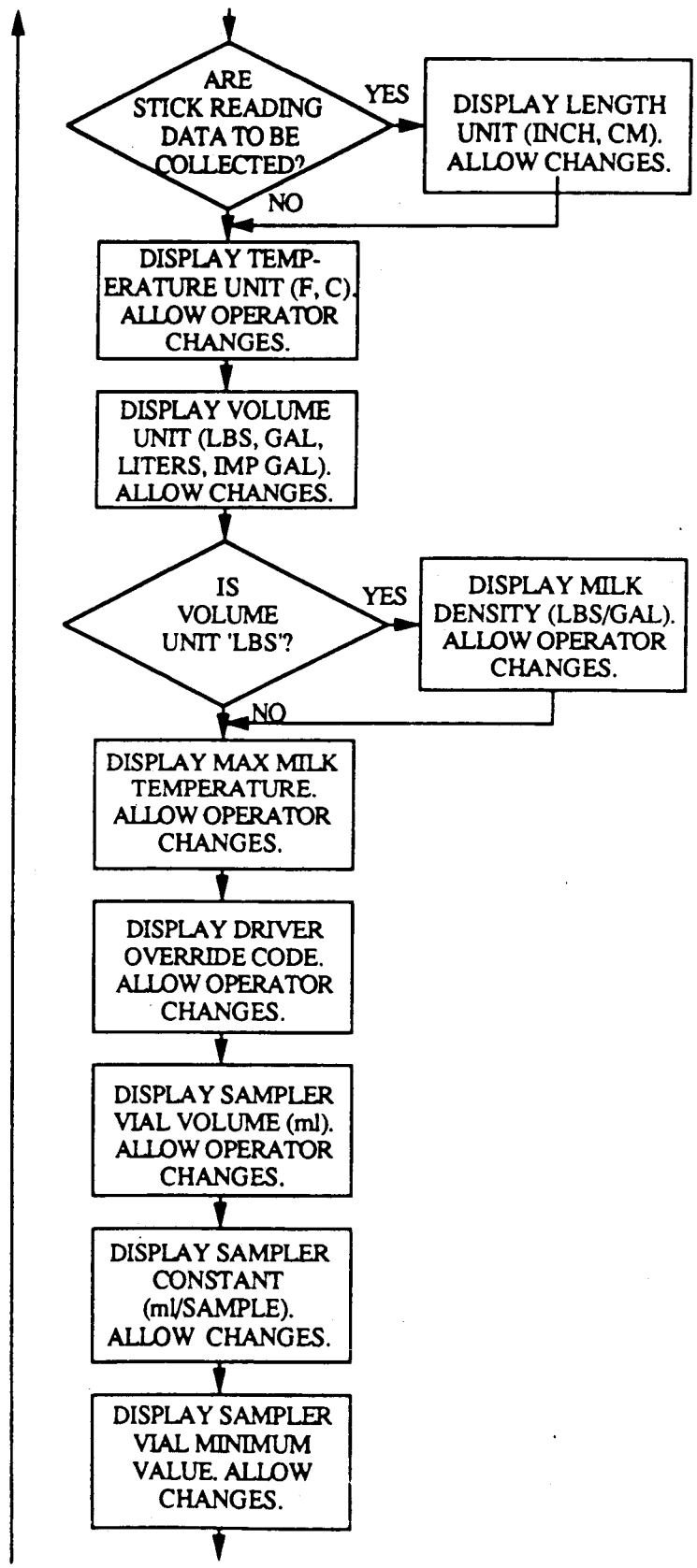
Figure 12:
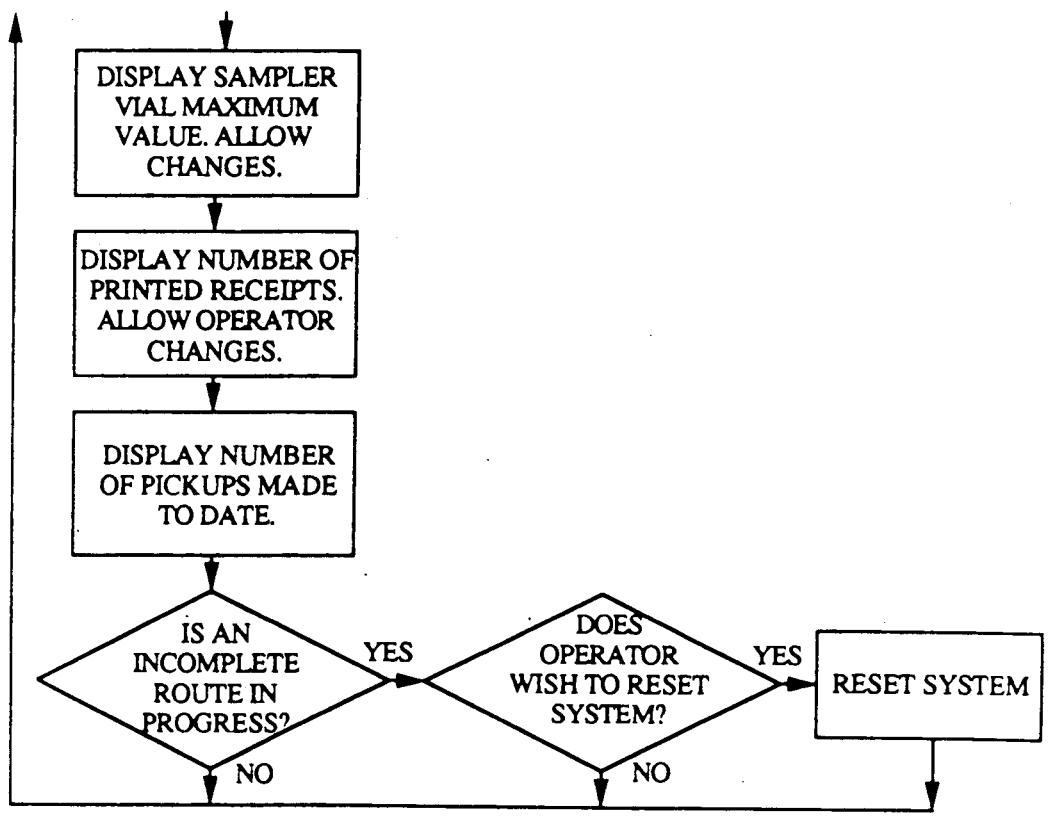
Figure 13:
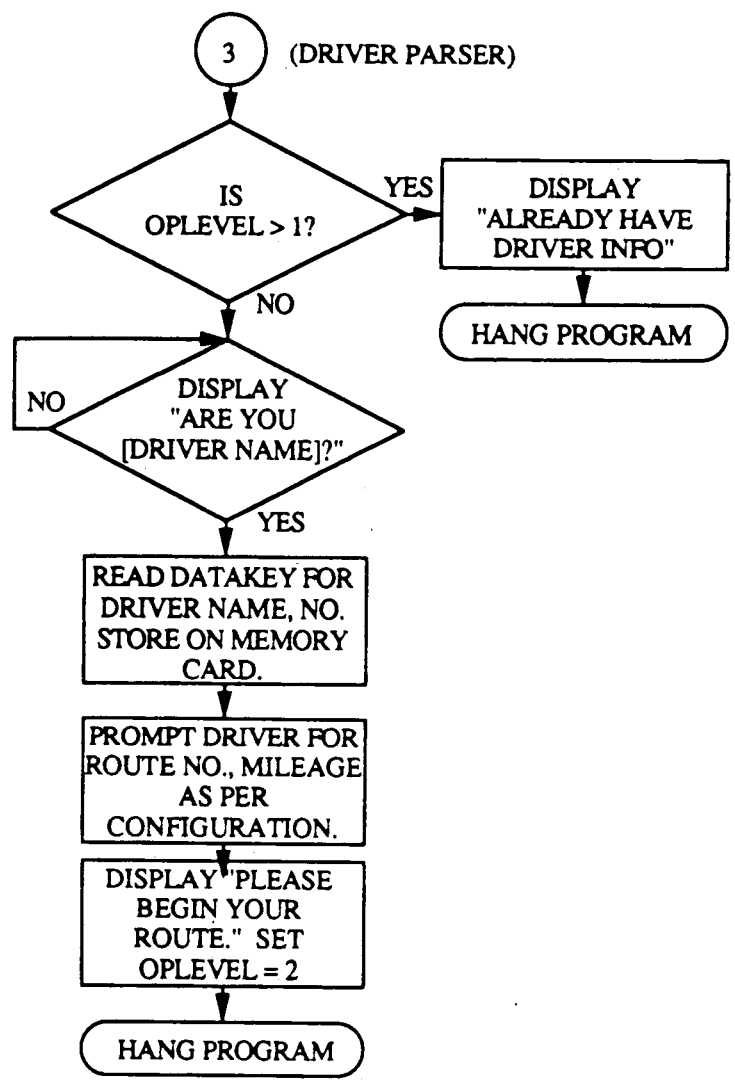

A block schematic electrical circuit diagram of the circuitry of the on-board programmable controller/processor 74 mounted in the cabinet 76 is shown in FIG. 3. The controller/processor circuitry 74 includes a micro computer 106 and a mother circuit board 108. The computer 106 is coupled to the visual display 98 and to the keyboard 80 as well as to the receipt printer 96.

Also inside the cabinet 76 is address decoding logic circuitry 110 mounted on an external memory circuit board 112. The logic circuitry 110 is connected to the RAM card 92, to the receptacle and key assembly 84, and to the LED lamps 82.

The external memory circuit board is connected to the mother board 108 which has mounted thereon milk temperature circuitry 116, bus drivers 118, and meter probe signal conditioning circuitry 120.

The drivers 118, the conditioning circuitry and the temperature circuitry are also coupled to address, data and control bus drivers 122 coupled to the micro computer 106. The conditioning circuitry 120 is connected to a meter probe 124 that is mounted on the flow meter 54.

The mother board 108, the micro computer 106 and the receipt printer 96 are also coupled to a power supply 126. Further located on the mother board are a bank of twelve (12) connectors which are connected respectively to the micro computer 106 and a PB4 rack to the meter probe 124 and to the temperature probe 64 (RTD Resistance Temperature Device) and to the emergency override switch 104.

Referring now to FIG. 4, there is illustrated therein a block schematic electrical circuit diagram of the processor circuitry 134 in an off-board programmable controller/processor 134 which performs part of the data collection and processing system of the present invention. This controller/processor 134 includes a micro computer 136 which can be part of the controller/processor 134 or which can be a personal computer. Similar to the circuitry shown in FIG. 3 the processor circuitry 134 includes a visual display 138, a keyboard 140 connected to the micro computer 136. Also connected to the micro computer 136 is an activity log printer 142. The printer 142 and the computer 136 are connected to a power supply 144. The power supply 144 is also connected to a mother board 148 having bus drivers 150 coupled to the computer 136, a bus connection 152 to an external memory circuit board 154 and a connection to an emergency override switch 156.

The external memory circuit board 154 is substantially identical to the external memory circuit board 112 shown in FIG. 3 and includes address decoding and logic circuitry 158 adapted to be coupled to a RAM card 160, a receptacle 162 adapted to receive an EEPROM key and a group 164 of error indicating lamps.

In FIG. 5 there is illustrated a perspective view of the key receptacle 86 or 162 connected to a multiconductor cable 168 and the key 88 positioned for insertion into the receptacle 86.

In FIG. 6 there is illustrated the key 88 inserted into the key receptacle 86 or 162.

In FIG. 7 there is illustrated the pluggable, insertable/removable EEPROM RAM card 92 or 160 which has a plurality 170 of connector pins.

The RAM card 92 or 160 is adapted to collect and store data when used with the processor 74 and to supply data when used with the processor 134.

SYSTEM OVERVIEW

The electronic components of the system includes two different hardware configurations: the field unit, i.e., processor 74 and the base unit, processor 134. The field unit 74 is located at the rear of the truck 10 and records the data involved in the collection of producers' milk. The base unit is typically located indoors, is connected to an IBM PC or compatible computer (not shown), and recovers the route data that the field units 74 have stored.

The medium used to get data from the field units 74 into the base unit 134 is the credit card-sized solid state RAM card 92 or 160, referred to as a data card 92 which is of the type which is manufactured and sold by E. I. DuPont Electronics, Research Triangle Park, N.C.. The field units 74 store their data on data cards 92, and the drivers carry them indoors to the base unit 134 at a route's end, where the day's data is recovered from the data cards and transferred to the IBM PC for processing or uploading to a mainframe computer. When a data card's contents are safely stored on-line, the data card 92, 160 can be erased and used the next day.

The system utilizes another memory device, namely the key-shaped solid state EEPROM 88 called the data key 88 which is manufactured and sold by Datakey, Inc., Burnsville, Minn.. The use of data keys 88 virtually eliminates all keypad data entry by the driver. Instead, he inserts a data key 88 into its receptacle 86 on the panel 78, and the key 88 identifies itself to the system. For example, each producer on a given route has a data key 88 on-site. When a driver arrives to pick up that producer's milk, he inserts the producer's data key 88 into the system, and the producer is immediately identified and his Producer Number recorded on the data card 92. Likewise, the driver has a key 88 of his own to identify himself to the system. Thus, the accuracy of the data collected is not dependent on a driver's typing skills.

FIELD UNIT HARDWARE

The front panel 78 of the system appears in FIG. 2. The components are, from left to right: a keyhole 180 in the receptacle 86 for data keys 88, the receipt printer 96 (FIG. 3) located behind the slot 94, a door 182 behind which is the data card slot 94, system status indicator lamps 82, the display 98 which is a two line, 40 character vacuum fluorescent display 98, the keypad 80, an emergency switch 190, and a power switch 192.

The slots 90 and 94 provide the means for the field unit 74 to system access the data stored on data key 88 and data cards, respectively. One Key and one Card must be inserted at all times while the field unit 74 is turned on. If one is removed while the unit is on (or is not present on powerup), it will display "ERROR-Check System Status Lamps" and an LED lamp will light in the System Status area (4) of the panel to indicate what happened. Correcting the cause will cancel the error condition, and the field unit 74 will run an operation program stored therein from the start, so that the driver cannot switch keys 88 to fool the system.

The receipt printer 96, is optional equipment for those who don't want to depend exclusively on the electronic media for transactional records. When included with the system, it will print a receipt with complete documentation of each transaction. It can also be used by an administrator to produce a hard copy of system variables.

The keypad 80, is used for driver entry of data. There are only two formats in which questions will be asked of the driver, and they are described below:

1. The software routine titled "YNInput" is called by the program whenever a yes/no answer is required of the driver. A question will be displayed on the display 98, and the lower right-hand 3 characters are reserved for the driver response. A default answer ("Yes" or "No") will appear in the driver response area. He may now press the "Yes" or "No" keys to enter his answer; then he presses "Enter" to register his answer. If the default response is his desired response, he can press "Enter" immediately without pressing "Yes" or "No". Note that the only keys that have an effect in this mode are "Yes", "No", and "Enter".

2. The software routine called "GetInput" is called by the program whenever a numerical response is needed. A description of the desired number appears on the display 98, with the lower right-hand eight characters reserved for the driver response. A default value will be displayed in this area. If the driver wishes to enter the default value, he has only to press "Enter". If he wants to enter a different number, he must backspace (with the left-arrow key) over the default number and enter his own with the number keys, then press "Enter". For many parameters, there are limits imposed on the driver's response. For example, when the field unit 74 requests a mileage entry of the driver, he must answer in the range 0-999999. If he is outside this range, the field unit 74 will display "TOO BIG" or "TOO SMALL" for about 2 seconds. Then it will ask the driver whether he wants to override: "OVERRIDE?" The driver may answer either "Yes" or "No". If he answers "Yes", the field unit 74 will display "CODE:" and wait for the override code. If the driver enters the correct override code, the original number is accepted, even though it is out of range. If the wrong code is entered, or if the driver answers "NO", he does not wish to override, the field unit 74 will continue waiting for a legal number to be entered. Sometimes, a number with a decimal value will be allowed. In these cases, the decimal key (.) will be accepted. Otherwise, it will be ignored by the field unit 74. The only other keys that are recognized by "GetInput" are the numbers 0-9, the "Enter" key and the backspace key.

The emergency switch 190, is only used when circumstances prevent a driver from picking up a producer's milk. For example, if a producer's data key 88 is lost (or the field unit 74 itself somehow fails), there would be no way for the driver to coax the field unit 74 into turning on the pump 70 to receive that producer's milk. He would have to press the emergency switch 190. When it is pressed, the switch 90 energizes the pump relay directly, with no dependence on the field unit 74 at all. However, if the field unit 74 is functioning properly, it will record the event and report it with the day's data on the data card 92.

The switch 190 has a plastic guard over it with a seal-wire hole in the cover, so that the seal must be broken to raise the guard to press the button. Thus, physical proof exists that the process 74 was overridden, as well as the field unit's 74 stored record of the event.

The power switch 192, is used to power up the field unit 74. Note that this switch 192 can be used at any time with no danger of losing data. The only possible consequences are:

1. The field unit 74 might ask the driver a question he already answered right before he turned it off. This is a trivial inconvenience for the driver, who must then answer a few questions a second time. He shouldn't have killed the power in the first place.

2. The field unit 74 might register one false meter pulse picked up by the probe 124 each time the power switch 192 is used (if the field unit 74 was pumping at the time). This equates to about a 1/30th gallon error.

3. The field unit 74 would not see any of the meter pulses picked up by the probe 124 that occur right after the power is removed but before the pump stops coasting down. When the field unit 74 power goes, so does power to the pump, but pump and milk inertia will force some milk through the meter uncounted.

Internally, the cabinet 78 of the field unit 74 has an electronics rack containing three circuit boards: an Auxiliary Board, the mother board 108 which can be an Octagon Systems SBS-1000 Computer Board manufactured by Octagon Systems Corporation, West Minster, Colo. or other similar device, and a Power Supply Board; the external memory board 112 to which a data card 92 header and key receptacle 86 are connected; a relay board manufactured by Opto 22, Huntington Beach, Calif. or other similar device, on which solid-state relays that switch the pump and sampler are mounted; a temperature transmitter which is manufactured by Minco Products, Inc., Minneapolis, Minn. or other similar device, and which is a small black box that converts the RTD probe 64 signal into one of the computer 106 can read; a heating element 102 and thermostat 100 which are wired directly to the 12 V input to the cabinet 76 so that they do not go off with the panel-mounted power switch 192; and a terminal strip.

SYSTEM OPERATION - FIELD UNIT

A typical day with the field unit 74 from the driver's point of view would go as follows:

As a driver prepares to begin his route, he would pick up a blank data card 92, insert it into its slot 90 on the field unit 74 mounted on the truck 10 he is to drive, and insert his own driver key 88 into the keyhole. Then he would turn on the field unit 74.

If the data card 92 already contains data (it wasn't properly erased after its previous use), the display 98 of the field unit 74 will display "ERROR - Card already contains data." No further use of this card will be possible until it is erased.

The field unit 74 software will begin by asking the Driver "Hello. Are you [driver name]?" The driver must respond "Yes" to continue (the field unit 74 reads the driver's name from his data key 88). Next, the field unit 74 prompts "Enter route number" at which point the driver enters the route number on the keypad (0-6 digits, no fractional values). If no odometer pulser is connected, the field unit 74 will then prompt "Enter Mileage." The driver keys on the keyboard 80 in the mileage on his odometer (0-6 digits, no decimals). Afterward, the field unit 74 responds, "Please Begin Your Route." No further keypresses will be recognized, and the driver should turn off the field unit 74 and remove his data key 88. He leaves the data card 92 in its slot for the duration of the route.

At this point, the following data are recorded on the data card 92:

| Date | (from on-board clock) |
|---|---|
| Time | (from on-board clock) |
| Vehicle Number | (from internal memory) |
| Route Number | (from keypad entry) |
| Driver Number | (from Driver data key 88) |
| Mileage | (from keypad entry/internal memory) |

Also at this time, the driver's name is copied from his driver data key 88 onto the data card 92 so that his name can be printed on producer receipts. Also copied from key 88 to card 92 is the Ticket Message, a six line customized header that appears at the top of every printed receipt.

If the driver tries to present his driver data key 88 to the field unit 74 a second time, it will display "ERROR - Already Have Driver Info" and not allow additional driver input. Note that a data card 92 will store data for ONE DRIVER ONLY and ONE ROUTE ONLY and ONE VEHICLE ONLY.

The driver gets in his vehicle and drives to his first stop. He gets the Producer data key 88 from its peg on the milkhouse wall and inserts it in the keyhole 180 on the field unit 74, and turns it on. The field unit 74 asks "Is This [producer Name]?" The driver must respond "Yes" to continue. The field unit 74 then prompts the driver for his mileage (unless an odometer pulser is in use).

Next, the field unit 74 prompts "Enter Sample Number" with the producer number as a default value. Usually, sample vials are labelled with the number of the producer they came from. If this isn't the case, the driver can key in the correct sample number. Otherwise, he can just hit Enter.

What happens next depends on system configuration. If the field unit 74 is configured to collect Stick Reading and Quantity, it will prompt the driver, "Enter Stick Reading ([units])." The [units] are either inches or centimeters, depending on system configuration. Next, the field unit 74 will ask "Enter Stick Quantity ([units])," where [units] here are either Gallons, Pounds, Liters or Imperial Gallons. The Stick Quantity will be used as the basis for driving the milk sampler.

If the field unit 74 is not configured to collect the Stick Reading and Volume, it will prompt "Estimate Load Size ([units])." where [units] is the configured volumetric unit. A default number will also be displayed. This is the quantity of milk received from this producer the day before (it is stored on the producer's data key 88 after each pickup). The driver may either accept this number as a fair estimate of the volume of milk by simply pressing Enter, or he may backspace over it and enter a (hopefully) more accurate estimate of the volume. This number is only used for properly driving the milk sampler.

At this point the following values are stored on the data card 92:

| Start Date | (from internal clock) |
|---|---|
| Start Time | (from internal clock) |
| Producer Number | (from Producer data key 88) |
| Sample Number | (from keypad) |
| Mileage | (from keypad/internal memory) |
| [Stick Reading] | (from keypad) |
| [Stick Volume] | (from keypad) |

Next, the field unit 74 displays "Ready to Start. Is Vial in Place?" The driver must answer "Yes" to this question to proceed. When he does so, the field unit 74 will display something like this:

| 320 lbs 36.4° F. |
|---|
| Hit Enter When Done |

Of course, the total volume will begin at zero, and the units will be whatever the system was configured for. The screen of the display 98 will be updated to display current values as often as it can, between counting meter pulses, measuring the milk temperature and driving the sampler.

The relay contacts through which the pump motor 70 is wired now close, and the pump 24 will run.

If the temperature of the milk exceeds the maximum allowed temperature, the field unit 74 immediately stops the pump 24 and displays "Milk Too Warm. Continue?" If the driver says "Yes", he will be prompted "Enter Override Code." If he does not enter the correct code, or he said "No" to the previous question, the pickup will be terminated and a receipt can be printed. If the driver does enter the correct code, the pump will be re-engaged and pumping will not be interrupted by subsequent violations of the maximum temperature. Note that milk temperature is not compared with the maximum allowed temperature until a specified quantity of milk has been metered, to allow the RTD probe 64 to adjust to the temperature of the milk. In this way, false violations of the maximum temperature on warm days are avoided.

When the driver presses "Enter" to indicate that the pickup is complete, the field unit 74 displays "Finishing Up . . . ", shuts off the pump 24 and waits a specified amount of time to count any meter 54 pulses that might occur while the pump 24 is coasting down. Then, it displays "Print a receipt?" to which the driver may answer "Yes". While printing, the field unit 74 displays "Printing . . . ", then will respond again with "Print a receipt?". This cycle will continue until the driver answers "No" or the specified maximum number of receipts is reached. If no printer is sold with the unit, the specified maximum number of receipts should be set to zero, and the driver will not be prompted thus.

When the unit is finished printing receipts, it will display "Pickup Complete" and accept no further input from the driver.

At this point, the following data are stored on the data card 92:

| End Time | (from on-board clock) |
|---|---|
| Gallons Delivered | (from internal memory) |
| Maximum Temperature | (from internal memory) |
| Average Temperature | (from internal memory) |
| Error Word | (from internal memory) |
| Update Total Manifest | (from data card 92 + internal |

-continued memory)

Error conditions which are trapped by the field unit 74 include the following:

The driver begins a pickup with one producer's data key 88, then tries to finish with another's data key 88. This error results in the message "ERROR - Finish Previous Farm First", and the field unit 74 will accept no further driver input until the unfinished pickup is completed. Note that a pickup is considered incomplete by the field unit 74 until the words "Pickup Complete" appear on its display 98.

The driver replaces the driver data card 88 with another in mid-route. This error results in the message "ERROR - Need Original data card 92", and no further driver input will be recognized until the field unit 74 is given the driver data card 88 it began the route with. Every data card 88 has a unique serial number stored on it, and this number is read and stored by the field unit 74 at the beginning of the route. Furthermore, a random tag number chosen by the field unit 74 is written to the card and stored in memory, so that if at any time the serial number and random tag number don't agree with those appearing on the currently inserted data card 88, the error will be detected.

When the driver's route is complete and he returns to the plant where his manifest will be received, he must insert one final data key 88 in the field unit 74's slot 90, the Receiver data key 88. There is one Receiver data key 88 for each receiving bay in the plant; the driver inserts the one corresponding to the bay his truck 10 is sitting in and turns on the power. The field unit 74 displays "Is this Bay [Bay number] of Plant [Plant number]?" to which the driver must answer "Yes" to continue. The field unit 74 then asks the driver for the mileage on his vehicle. Finally, the field unit 74 displays "Total Manifest [total] [units]", where [units] is the specified volumetric unit of the system. The field unit 74 will accept no further driver input, and the route is complete. These data are stored on the data card 92 at this time:

| | |
|---|---|
| End Date | (from on-board clock) |
| End Time | (from on-board clock) |
| Plant Number | (from Receiver data key 88) |
| Bay Number | (from Receiver data key 88) |
| Mileage | (from keypad) |
| No. of Producer Records | (from internal memory) |
| Hardware Error Word | (from internal memory) |

At this time, the field unit 74 prepares its internal memory for the next day's route. The data card 92 should now be removed from its slot and carried in with the day's samples to the lab.

If the driver neglects to present the Receiver data key 88 to the field unit 74, it has no way of knowing that the route has been completed. The next day, the driver will be unable to begin his next route because the blank data card 92 he has inserted very likely won't have the same serial number and random tag number as the previous one, and the field unit 74 will insist "ERROR - Need Original data card 92".

So far, the field unit 74 has been used with three different data key 88 types: the Driver Key, the Producer Key and the Receiver Key. It also recognizes two other key types: the Administrator Key and the Programmer Key, described below.

When presented with an Administrator data key 88, the field unit 74 displays "Administrator Key. Begin?" to which the user must answer "Yes" to continue. Next, the field unit 74 asks, "Echo Values to Printer?" This allows the administrator to make hard copies of the parameters of each Field Unit.

What follows is a series of questions that the field unit 74 asks in order to configure the system with the desired parameters. The present value of each parameter is displayed as the default, so the user can just hit "ENTER" if no change in that parameter is desired.

These are the questions asked by the field unit 74:
Current Time (24 hr format, hhmm):
Current Date (mmddyy):
Vehicle Number:
Collect Route Number Data?
 If the user answers "No", the field unit 74 will not prompt the driver for a route number.
Route Maximum Value:
Route Minimum Value:
 These questions are only asked if the user answered the previous question "Yes". They delimit the range of acceptable driver inputs for the route number.
Prompt Driver for Mileage?
 If the user says "Yes", the driver will be prompted for his vehicle mileage. Otherwise, the field unit 74 would try to read that value from an optional odometer pulser, whether it is attached or not (future).
Collect Stick Rdg and Volume?
 If the user answers this "Yes", the driver will be prompted at each pickup for a stick reading and volume. Otherwise, this data would not be collected.
Choose Length Unit: 1=in  2=cm
 This question only appears if the previous one was answered "Yes". Stick readings can be stored either in inches or centimeters.
Choose Temperature Unit: 1=F  2=C
 Milk temperature can either be displayed and printed in degrees Fahrenheit or Centigrade. Temperature is always stored on the data card 92, however, in degrees Fahrenheit.
Units: 1=lb  2=gal  3=l  4=imp. gal
 The volumetric units available for display and printing are pounds, gallons, liters or imperial gallons. Volumetric numbers are always stored on the data card 92 in gallons, though.
Milk Density, lbs/gal:
 This question is only asked if the volumetric unit specified was pounds.
Max Milk Temperature [units]:
 The maximum acceptable milk temperature is entered here, in the temperature unit specified above.
Driver Override Code:
 The code which allows a driver to enter an illegal value or override a maximum temperature violation is set here.
Sample Vial Size: (ml)
 Used for properly driving the sampler.
Sampler Constant: (ml/sample)
 This number is the quantity of milk that results from pulsing the sampler one time.
Sample Number Max Value:

Sample Number Min Value:
  These specify the range of legal values for the sample number.
Max No. of Printed Receipts:
  Set to zero if no printer 96 is supplied with the field unit 74 [number] Stops Made to Date. Go On? This is information only. The user can see how frequently the unit is being used. He must answer "Yes" to continue.
Battery Change Date:
  This is the date that the clock battery in the Field Unit was last changed. It is the basis for time-triggered notices to the system administrator. The administrator can change this date, but should only do so after changing the clock battery.
System Needs To Be Reset. Proceed?
  This is the only way an administrator has of resetting a field unit 74 that was not presented with a Receiver data key 88 at route's end. Answering "Yes" to this question will force the field unit 74 to believe that it is ready to begin a new route. ALL EXISTING DATA ON THE data card 92 WILL BE LOST.
Done. More Changes?
  If the answer is "No", the message "Administrator Changes Complete" is displayed, and the field unit 74 will accept no further input from the driver. Otherwise, the field unit 74 steps through all the questions again.

The purpose of the Programmer data key 88 is to change some system variables that would not normally be changed by the customer.

The field unit 74 has 52 non-volatile variables, ones whose values are preserved when the power is off. They are variables A% thru Z%, and A! thru Z!.

When a Programmer data key 88 is presented to the field unit 74, it displays "Programmer data key 99. Begin!" The user must respond "Yes" to continue. It then steps through the nonvolatile system variables, displaying the current value of each and allowing changes to be made. The display looks like this:

| Variable A% |
| --- |
| [default] | where [default] is the current value of A%.

Since the field unit 74 gives no description of each variable, the user must know what the function of each variable is. Their descriptions appear below:

| | | | |
| --- | --- | --- | --- |
| A% | OpLevel - Current level of operation of the system. This is how the field unit 74 knows where it is in the pickup cycle. | | |
| | 1 = Ready to Begin Route | 7 = Done Pumping, Coasting Down | |
| | 2 = Driver Input Complete | 8 = Done counting meter pulses | |
| | 3 = Producer Input Complete | 9 = Saved Ending Values | |
| | 4 = Pumping | 10 = Done Printing | |
| | 5 = Max Temp Violation/Probe Error | 11 = Clear Vars for next pickup | |
| | 6 = Pumping, Error Overridden | | |
| B% | Pickups = Number of pickups stored on memory card. | | |
| C% | Max Temp = Highest temperature recorded so far on present pickup. | | |
| D% | Sum Temp = Sum of all temp samples (for calculating ave temp) on present pickup | | |
| E% | n Temp = Number of temperature samples (for calc. of ave temp) on present pickup | | |
| F% | Farm Number = Producer number currently being served. | | |

-continued

| | |
| --- | --- |
| G% | System Error Word. This variable counts the number of the following hardware failures:<br>    1's = Emergency Switch Used.<br>    10's = Temperature Probe Error<br>    100's = General Media error/Meter Probe Error<br>    1000's = Memory Failure (X% <> 0) |
| H% | |
| I% | Pulses = Number of meter pulses received so far on present pickup. |
| J% | Pulses/Sample = number of pulses to wait between samples. This value is calculated on each pickup. |
| K% | No. of Receipts printed so far on present pickup. |
| L% | Scaled Temperature Value (Scratch) |
| M% | Number of samples taken so far on present pickup. |
| N% | Number of 10000's of Pulses received so far (with I%) |
| O% | |
| P% | |
| Q% | |
| R% | |
| S% | |
| T% | |
| U% | |
| V% | |
| W% | |
| X% | Always 0, watching for a memory failure. |
| Y% | RamCard Serial Number |
| Z% | Random Value Assigned to Current RamCard |
| A! | Vehicle Number |
| B! | Air Eliminator Capacity, Gallons |
| C! | Maximum acceptable temperature, F. |
| D! | Operator Override Code |
| E! | PPG - Number of pulses per gallon from meter. |
| F! | Sample High - Max allowable input value for Sample Number |
| G! | Sample Low - Lowest allowable input value for Sample Number |
| H! | Route Low - Lowest allowable input value for Route Number |
| I! | Route High - Highest allowable input value for Route Number |
| J! | — |
| K! | |
| L! | |
| M! | |
| N! | Configuration - b0:Plnt No. b1:Rte No. b2:Mileage b3,b4:(00 = lbs, 01 = gal, 10 = liters, 11 = imp gal) b5:Stick info b6: F/C b7:in/cm. Bits b0 through b7 are the binary bit values that make up an 8-bit byte. Each one is a flag indicating whether the feature is engaged or not. |
| O! | System Serial Number |
| P! | Vial Size, ml |
| Q! | ml/sample - No. of ml released in a 1-pulse sample |
| R! | System Usage Counter (Incremented with every pickup) |
| S! | Temp. in F. @ 5V. (20 mA) |
| T! | Temp. in F. # 1V. (4 mA) |
| U! | Max No. of Receipts allowed |
| V! | Gallons of Warmup Allowed. This is the number of gallons to meter before a temperature violation will be recognized. |
| W! | Precontact Time, Seconds. This is the length of time after pump shutoff that meter pulses should be counted. |
| X! | Pulses between temp samples. This value determines how many meter pulses to wait between temperature samples. A temperature sample takes 5 milliseconds to produce, so they should be taken infrequently, every 100 pulses (3 gallons) or so. |
| Y! | Density of milk, Lbs/Gal |
| Z! | Battery Change Date. This is the date that the on-board batteries were last changed. |

HARDWARE- BASE UNIT

Figure 14:
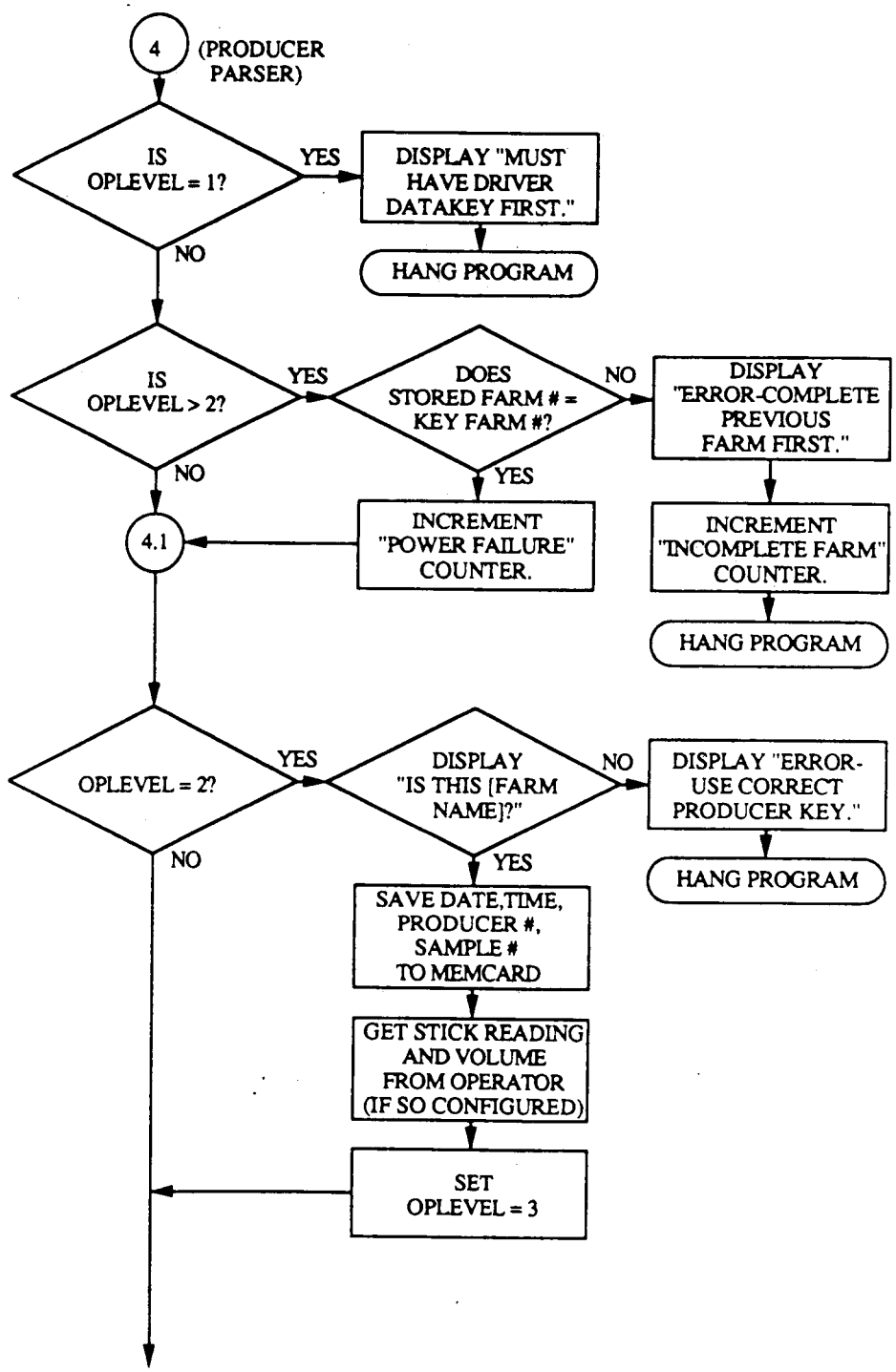
Figure 15:
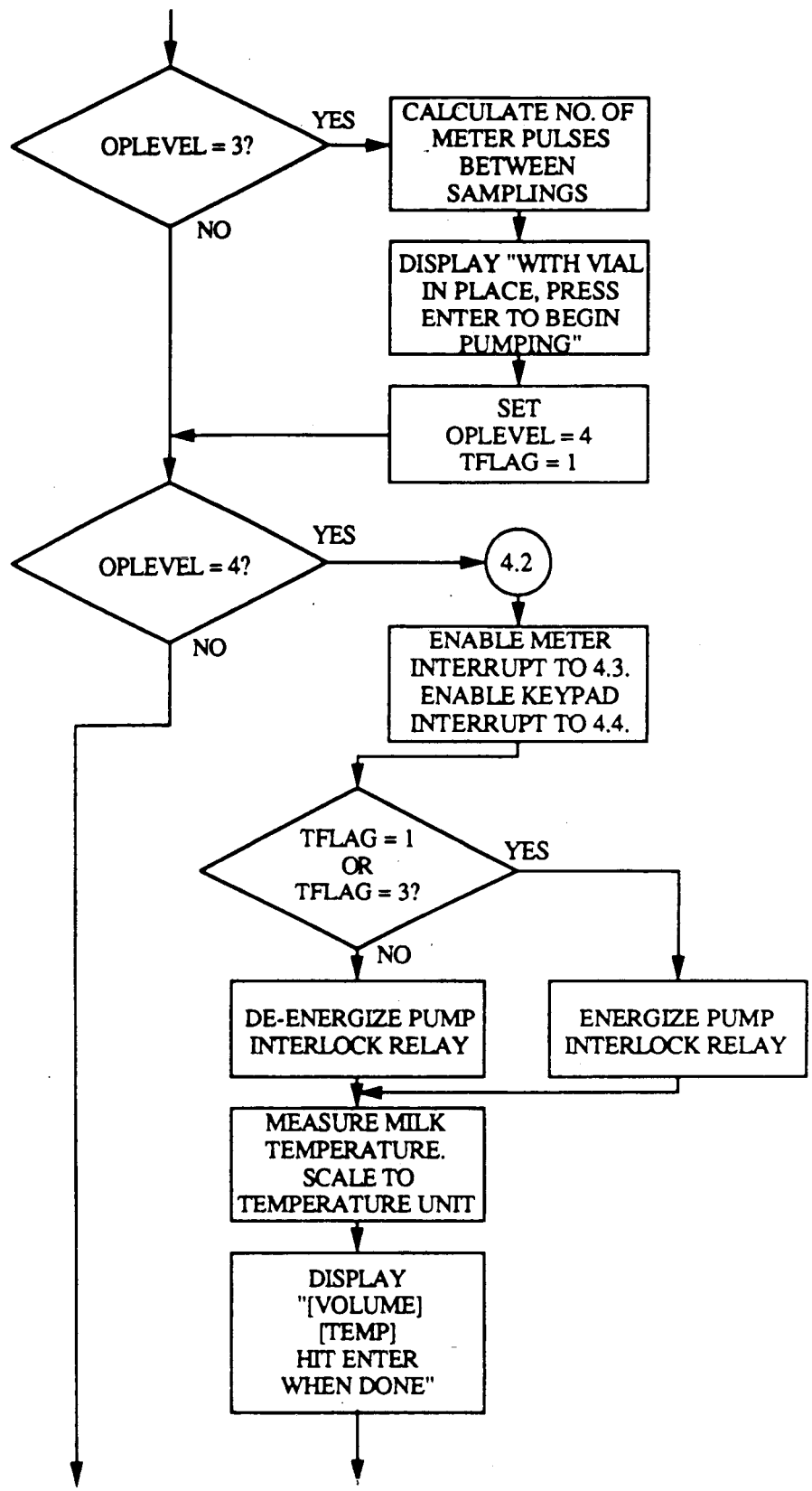
Figure 16:
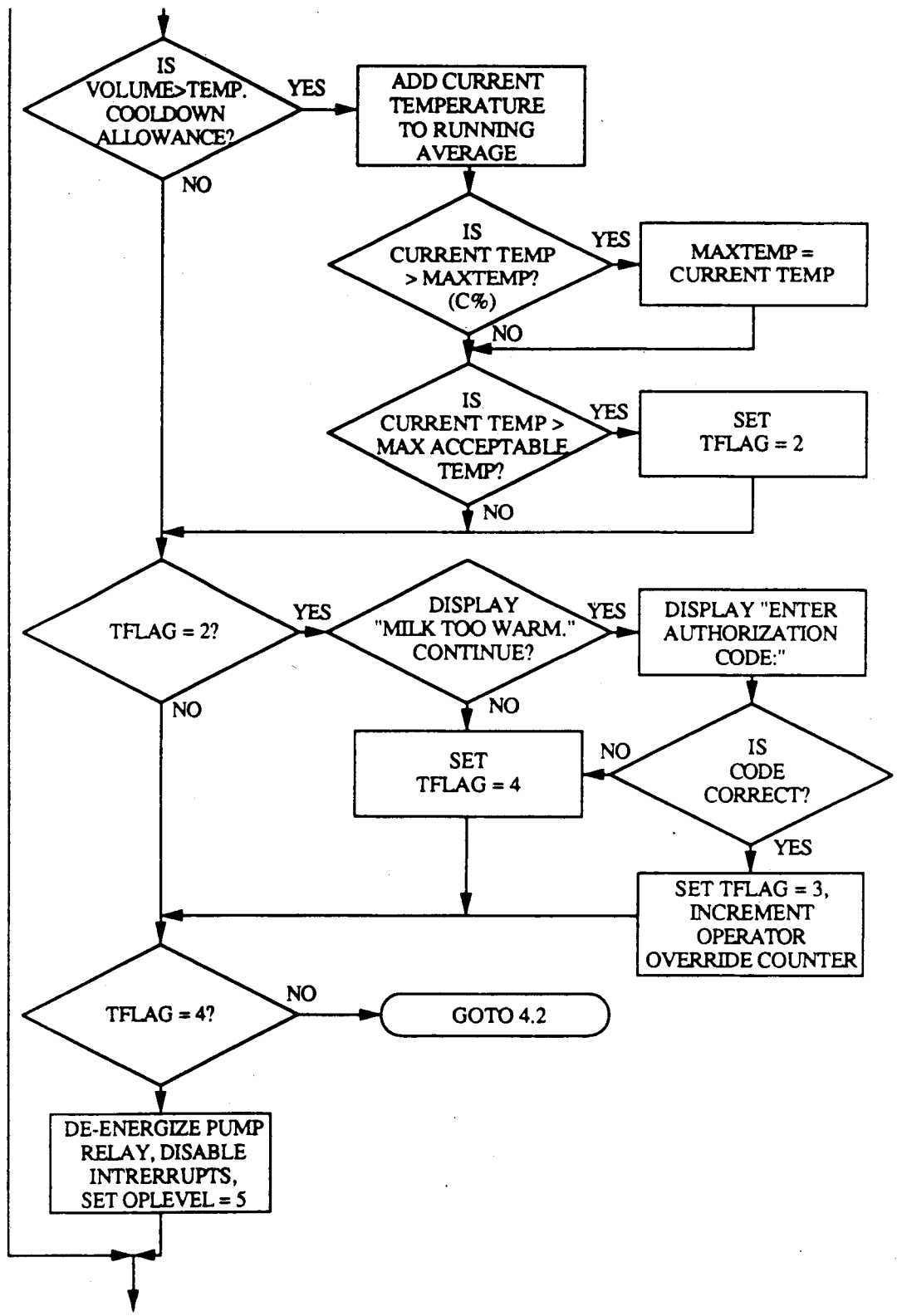
Figure 17:
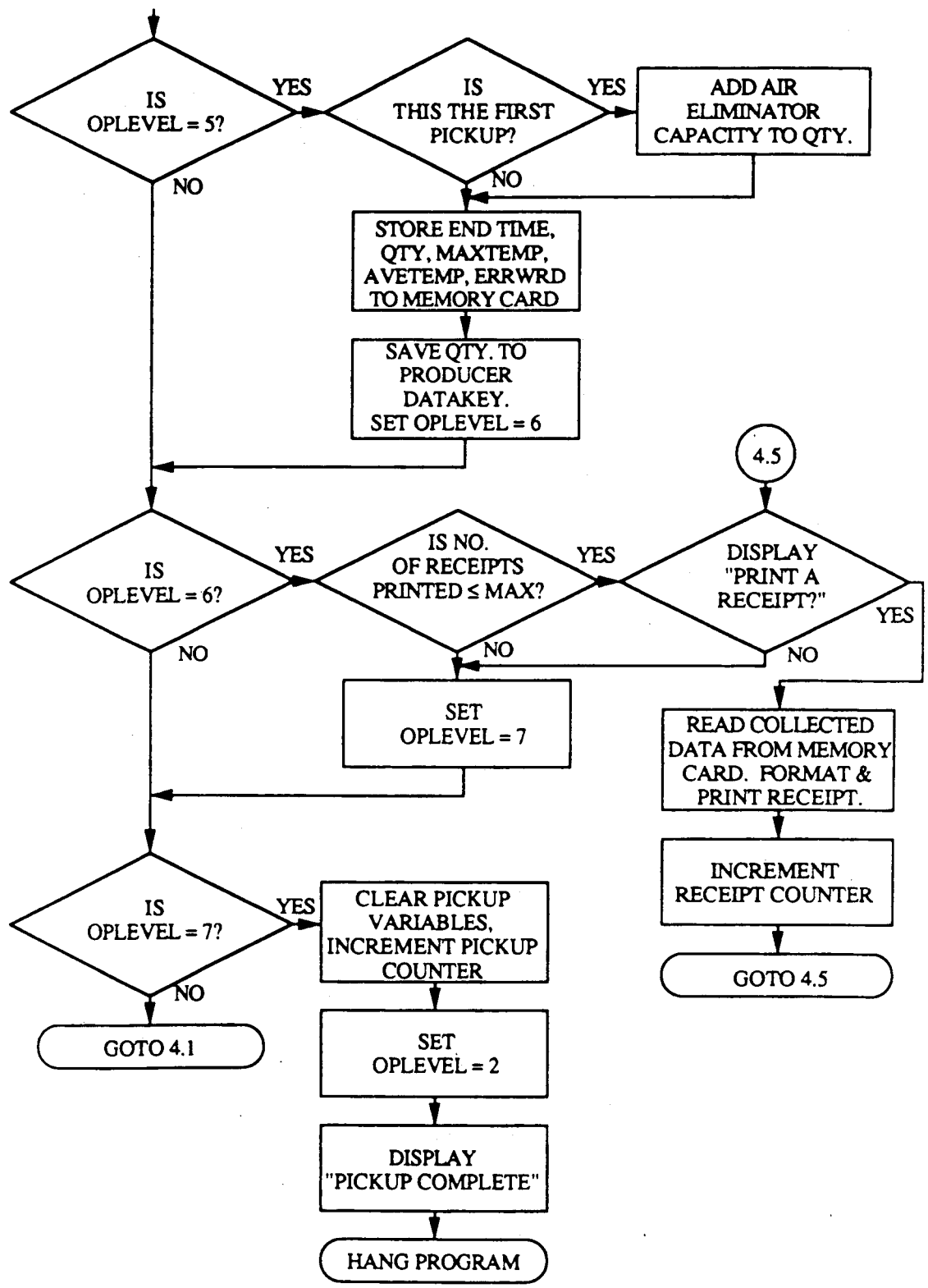
Figure 19:
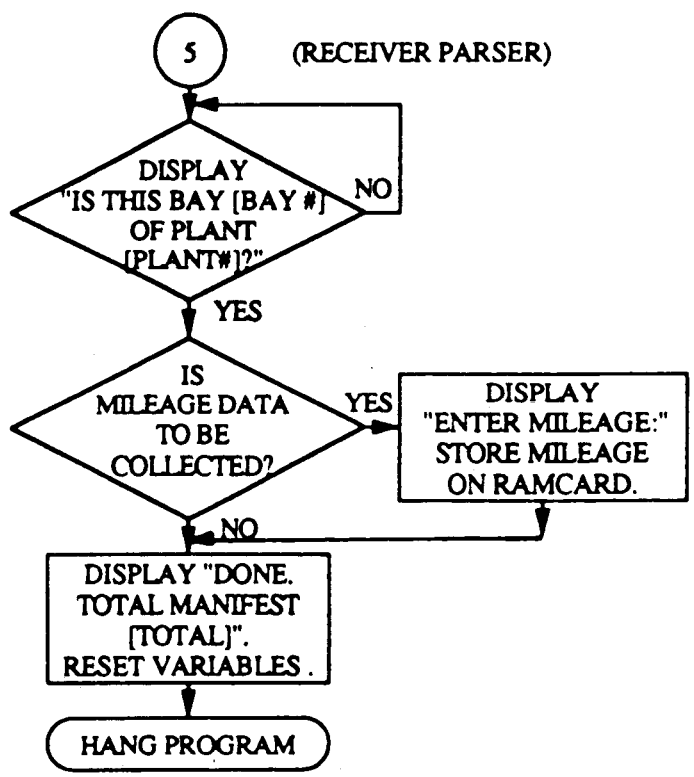
Figure 20:
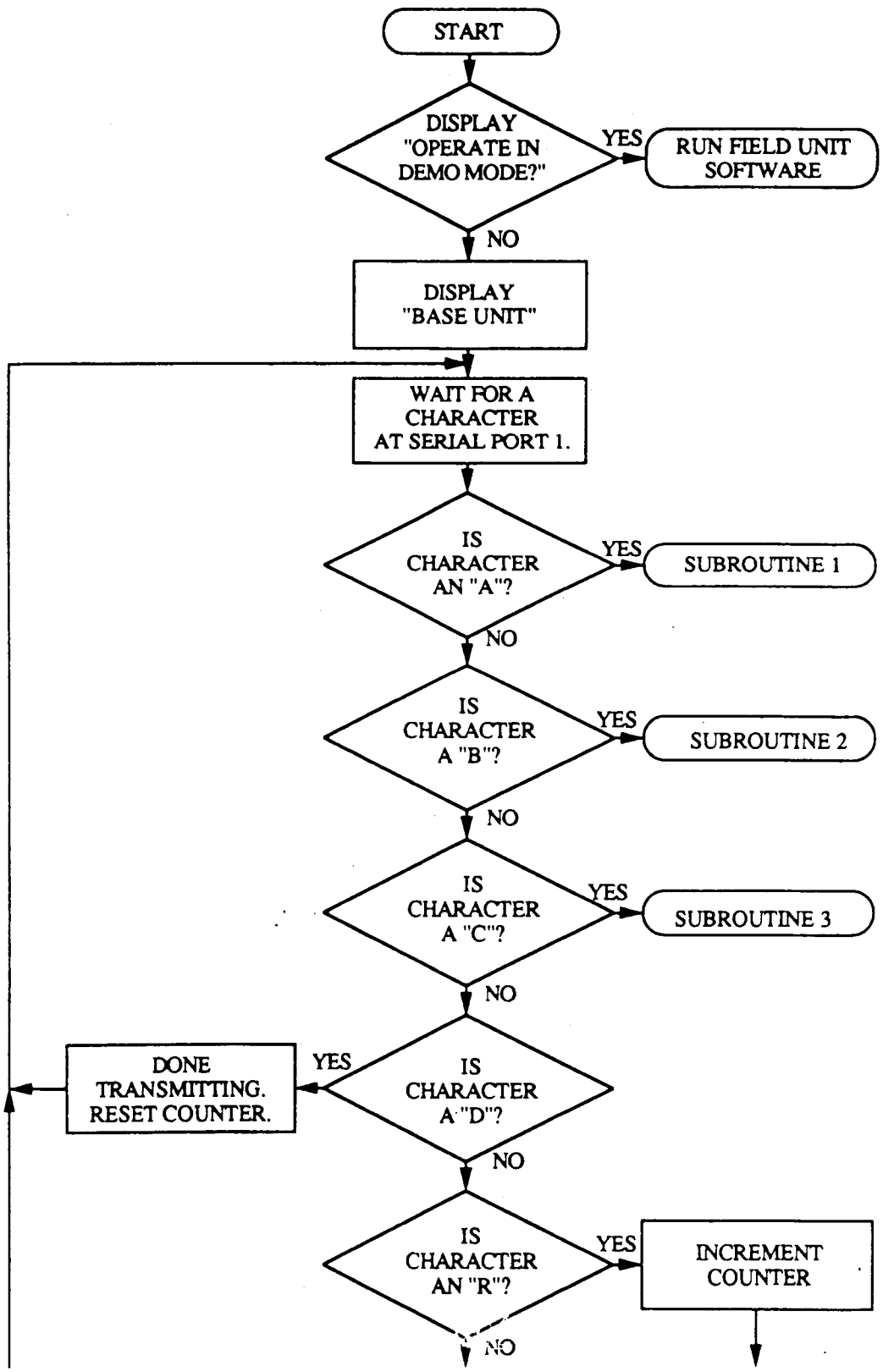
Figure 21:
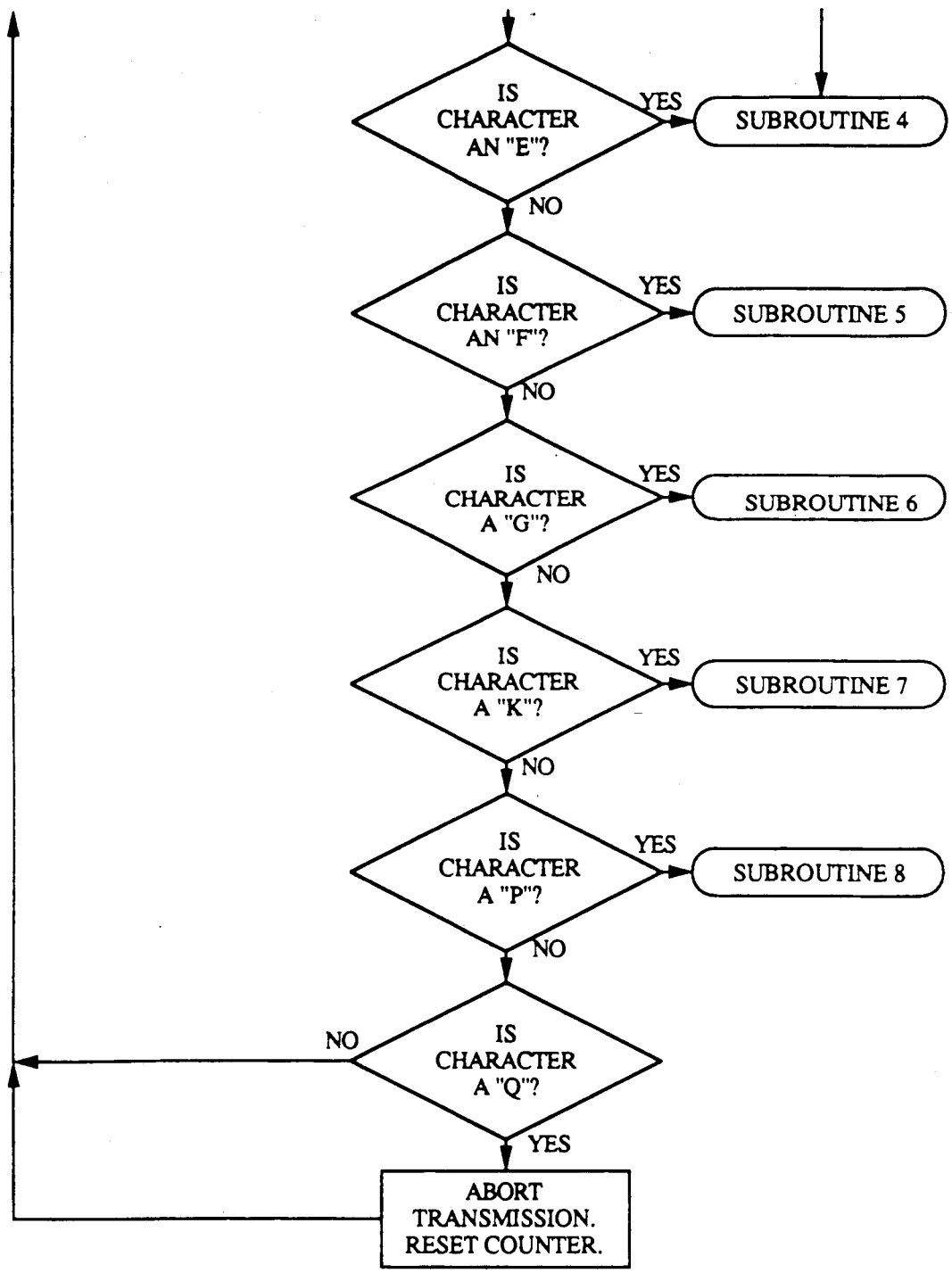
Figure 22:
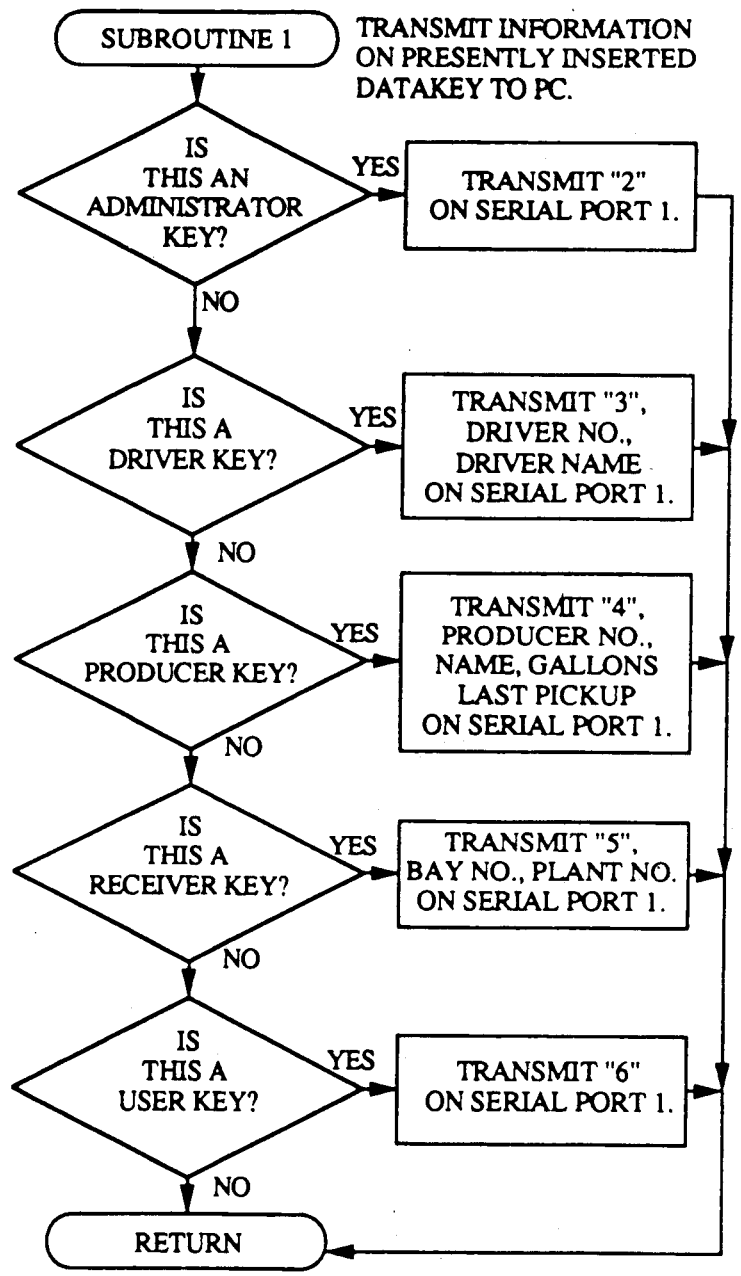
Figure 23:
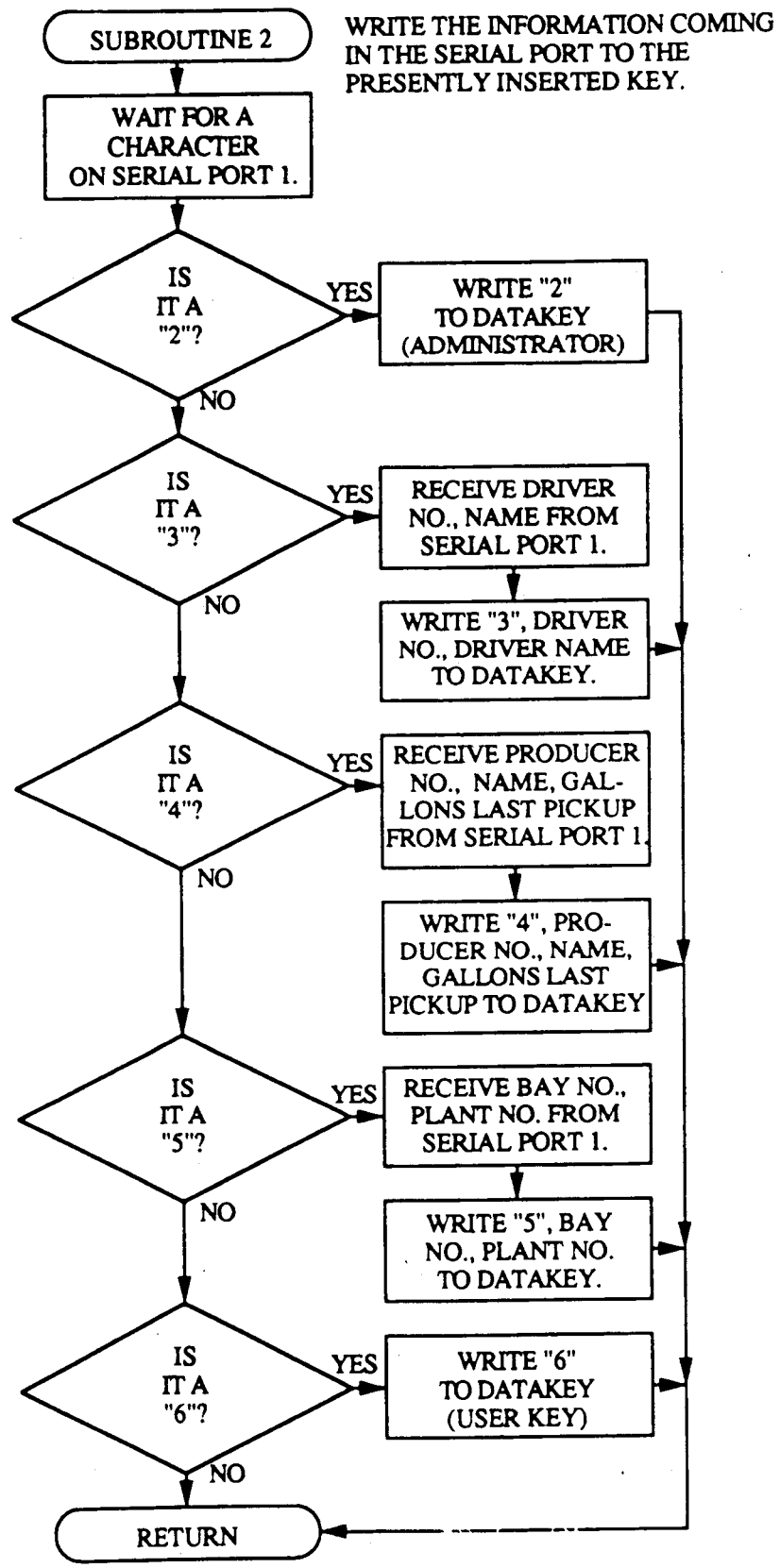
Figure 24:
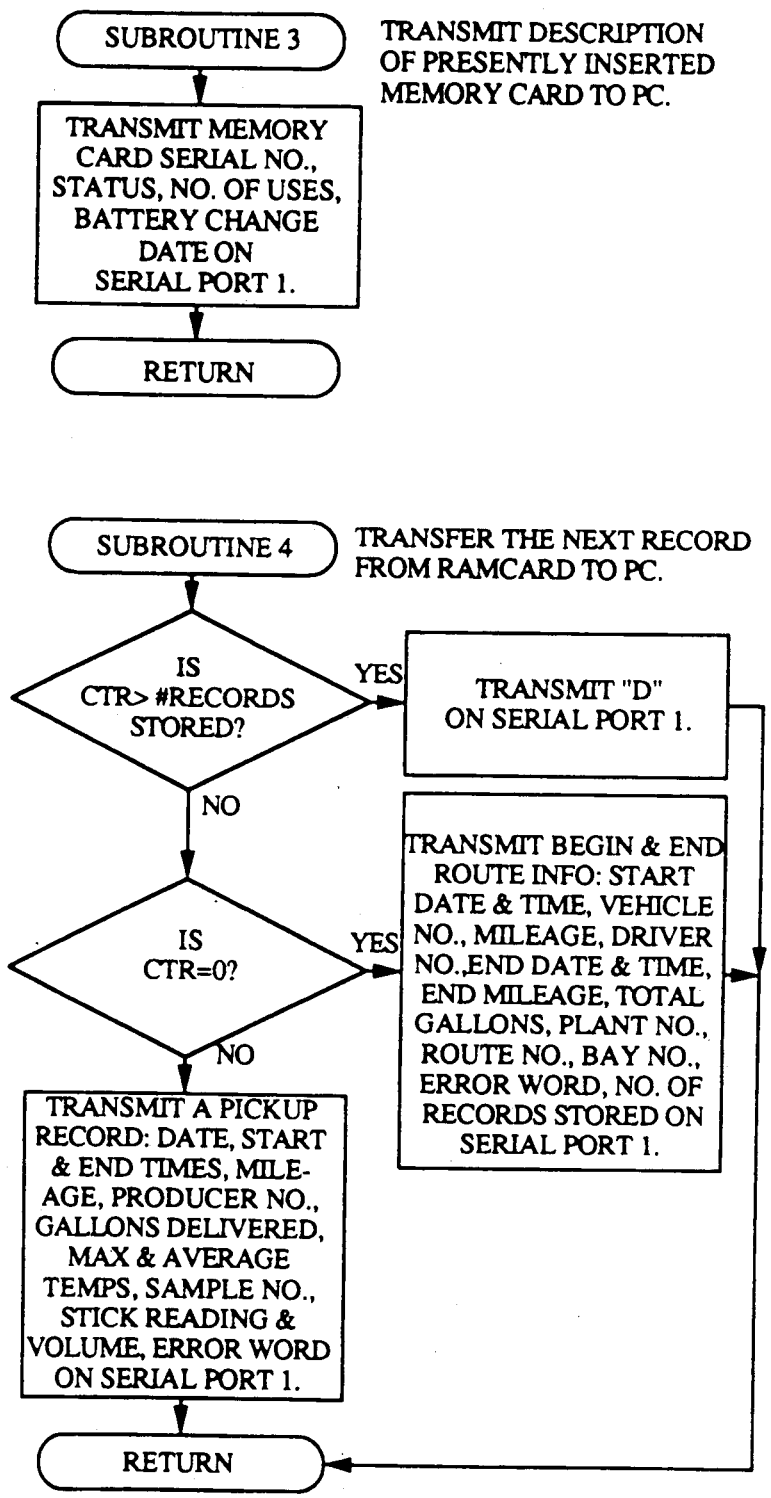
Figure 28:
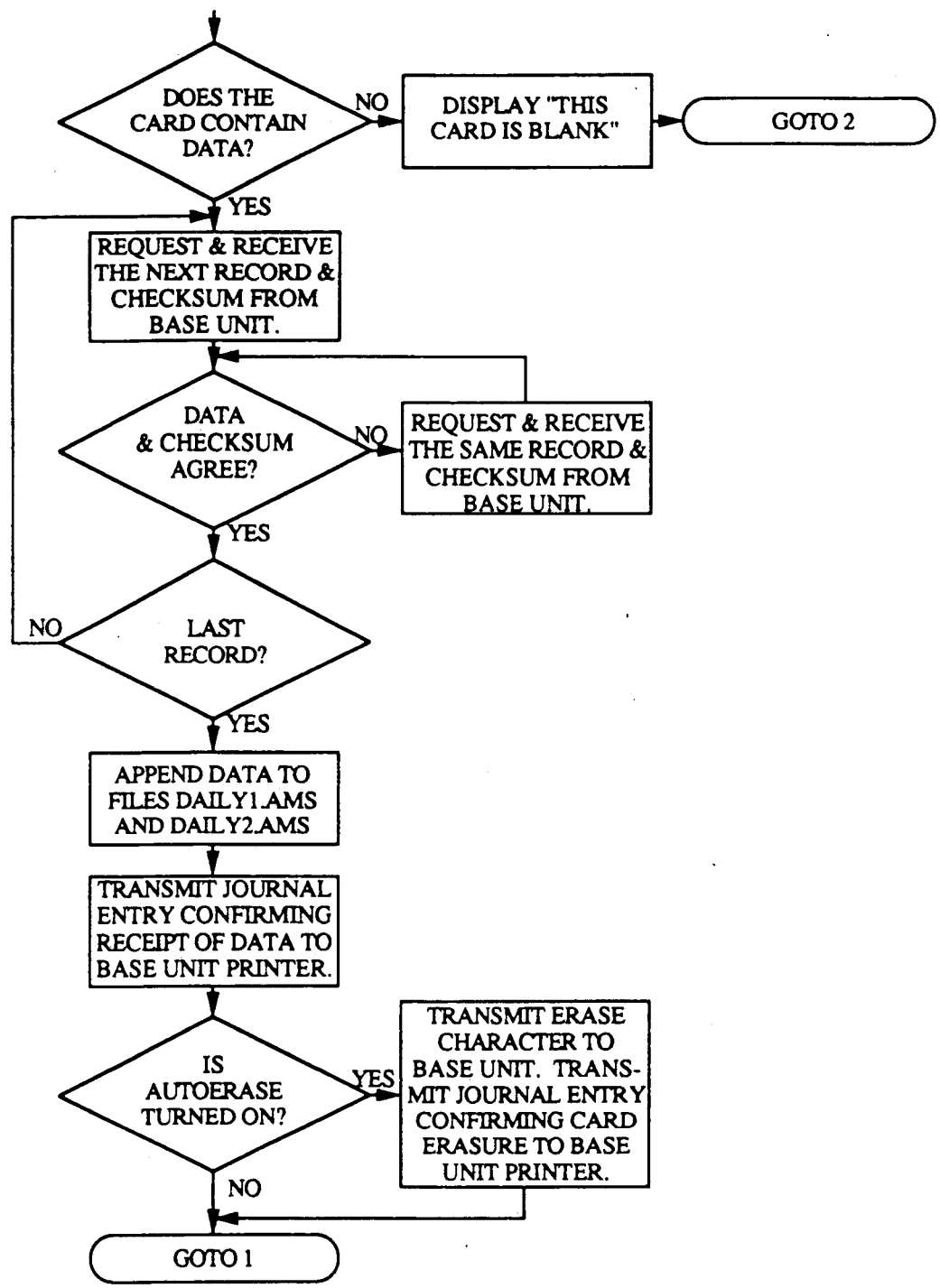
Figure 29:
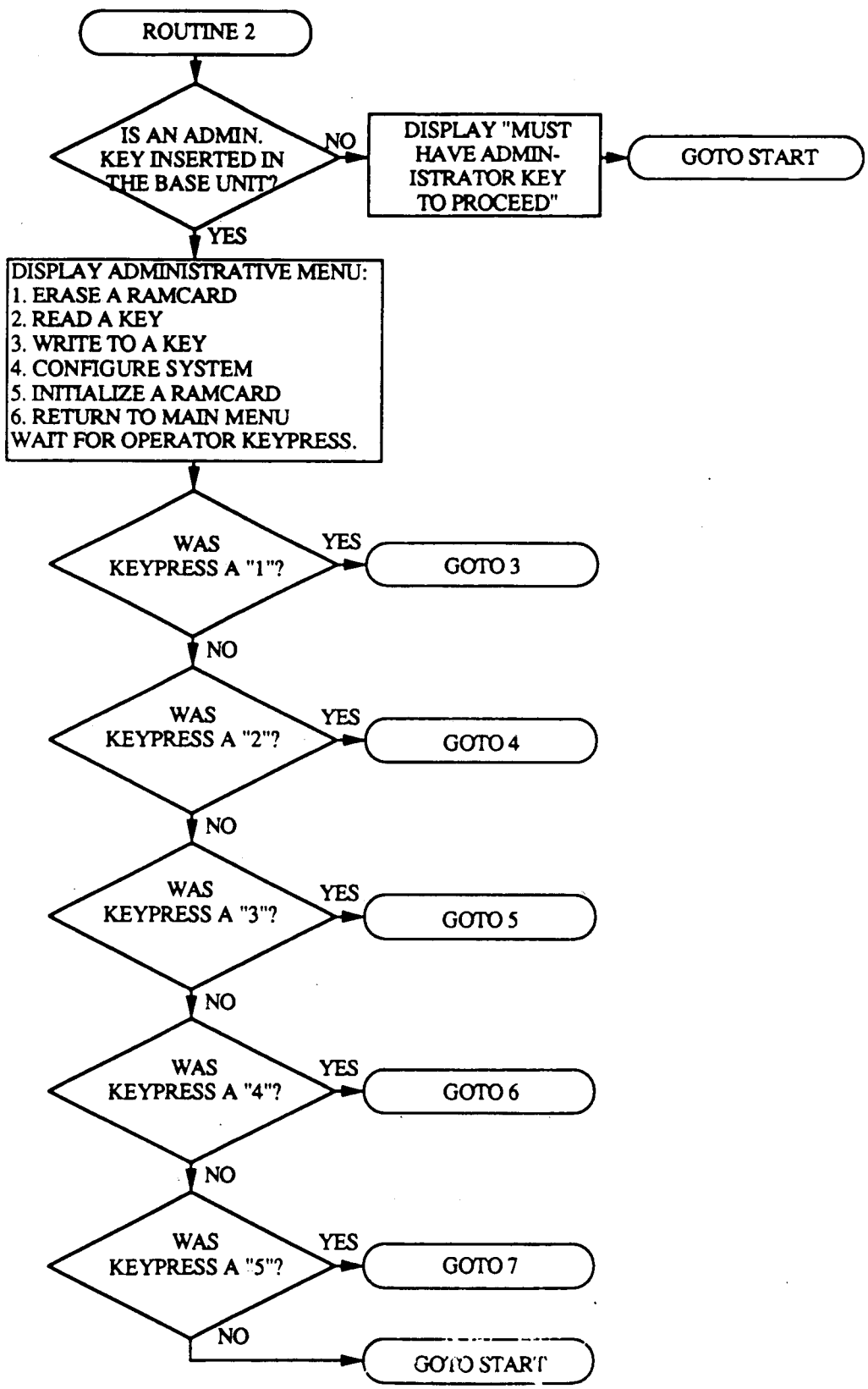
Figure 30:
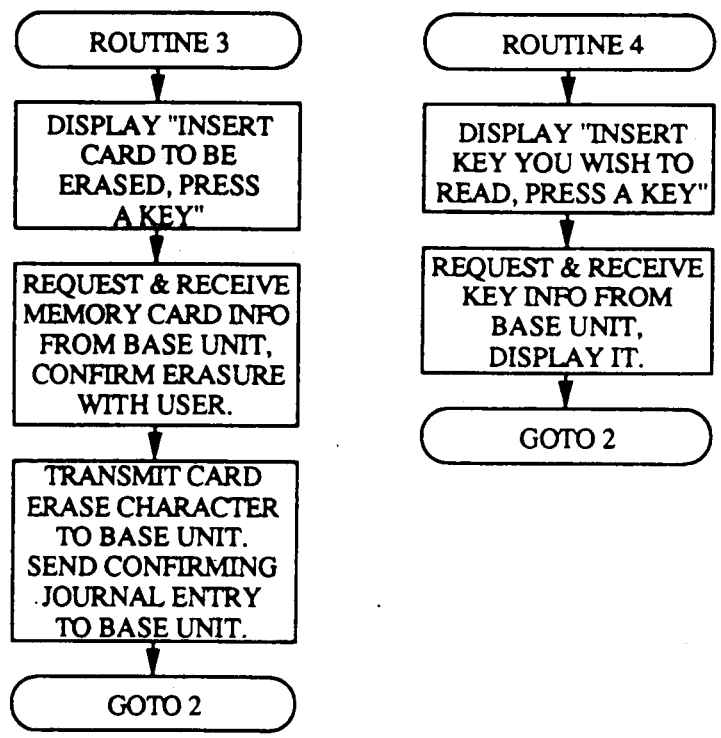
Figure 31:
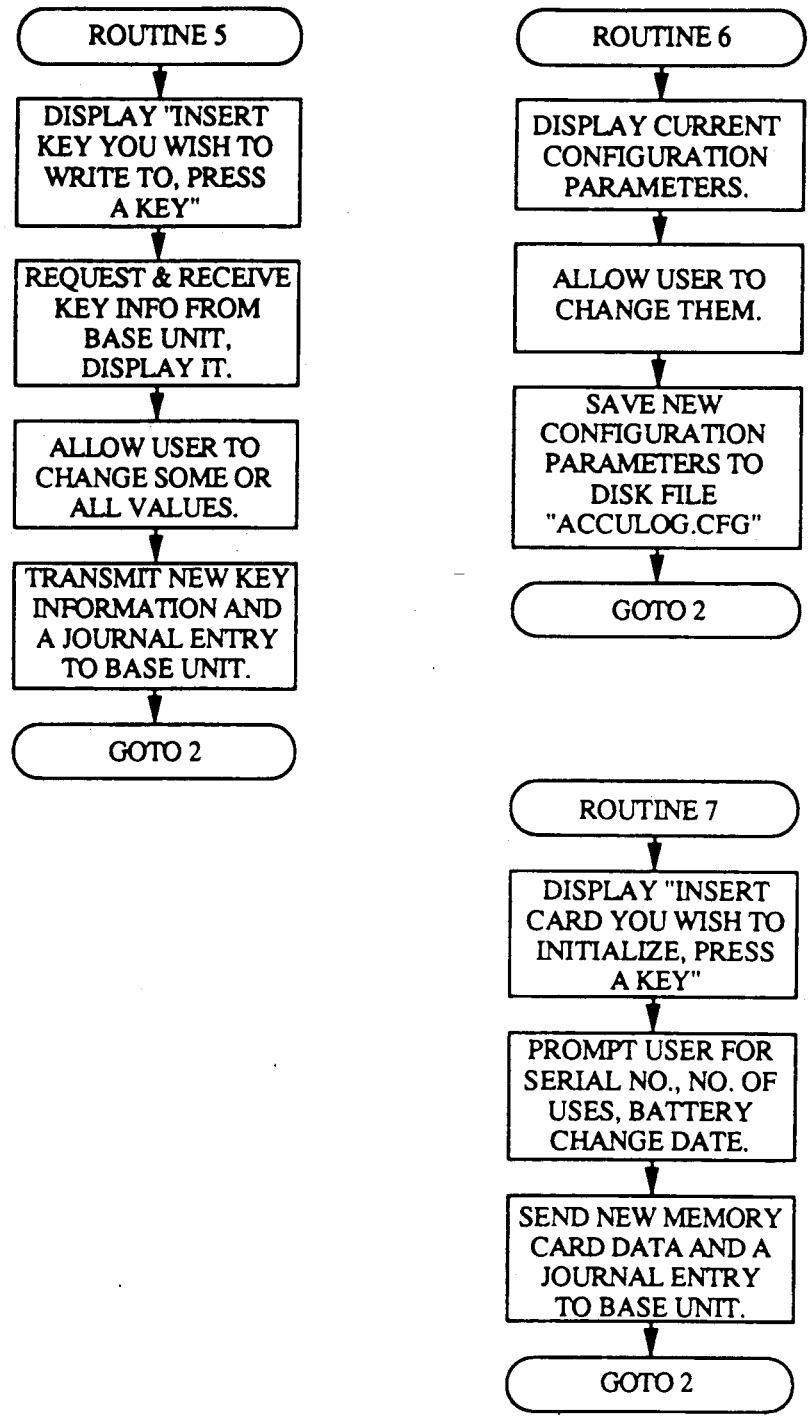

The base unit 134 looks identical to the field unit 74 on the outside; it has the printer 142, a card slot 161, the key receptacle 162, the display 138 and the keypad 140 as shown in FIG. 14. Internally, however, it is missing the following equipment that the field unit 74 has: Temperature Probe and Transmitter, Sampler, Relay Board, Thermostat and Heating Element. Since the unit is powered by 110 VAC, not 12 VDC, a Sola power supply is required in the base unit 134 to make the power conversion.

SYSTEM OPERATION - BASE UNIT

The function of the base unit 134 is two-fold. Primarily, it is used as an interface between the data collection media and an IBM PC-compatible computer, but it will also function like a field unit 74 for training/demonstration purposes.

Upon power-up, the base unit 134 asks "Operate in Demo Mode?" If the user responds "Yes", then the base unit 134 will behave just like a field unit, except that meter pulses and temperatures are generated artificially.

If the user responds "No", then the message "BASE UNIT" is displayed, and the unit is now dedicated to servicing data cards 92 and data keys 88. The PC-compatible computer that is connected to the base unit 134 must at this time be running the program called "ACCULOG.AMS". This program works with the base unit 134 to perform several vital system functions. The main menu is as follows:

1. Read Data From A Card
2. Administrative Functions
3. Exit Program

If the user selects item 1, a data key 88 called a User Key must be inserted in the keyhole 163 of the base unit 134. This key 88 would typically be in the possession of the data entry personnel that are in charge of recovering data from the data cards 92.

As soon as the presence of a User data key is verified, the base unit 134 begins transferring data from the presently inserted data card 92 to the PC. If a transmission error occurs, the PC will recognize it and ask the base unit 134 to retransmit. Any errors that occurred in the field would be logged on the base unit's printer.

To select Option 2, an Administrator data key must be present in the base unit keyhole 163. If it is there, the following sub-menu is called up on the PC screen:

1. Erase a RAM card
2. Read a Key
3. Write to a Key
4. Configure System
5. Initialize a RAM card
6. Return to Main Menu Once the user gets to this sub-menu, he can remove his Administrator data key from the keyhole 163.

Item 1 is used to erase a data card 92 after its data has been successfully transmitted into the system.

Item 2 will display on the screen of the PC the key type of whatever key 88 is inserted in the keyhole 163. Also, if the key is one that contains additional information, like a Driver Key (if it contains a driver name), that information will be displayed as well. The user is given the option of printing the information to the base unit's printer 142 for inspection/recordkeeping purposes.

Item 3 allows the user to alter the contents of a key. The program uses the values of the most recently read key (Item 2) of the same type as default values for the present key. Thus, the user can quickly duplicate key or produce a series of keys with slightly different values without retyping information over and over.

Item 5 is used if a data card battery is to be changed, or if its battery has failed and its data was lost. The user can set the Serial Number of the card (this should agree with the one stamped on its face), its usage counter and battery change date.

Item 4 calls up the following sub-sub-menu:
1. Set Volume Unit (G)allons, L(B)s, (L)iters, (I)mperial Gal
2. Set Temperature Unit (F,C)
3. Set Milk Density (Lbs/Gal)
4. Auto-Erase Cards After Reading (Y/N)
5. Set base unit Number (0-99)

These values are typically set only once, when the system is being configured. The field unit 74 field units store all collected data in English Units (Galls, degrees F). If other units are desired for storage in the database, they can be changed through Items 1 and 2, above.

If the desired unit is pounds, the density of milk must be entered via Item 3.

If item 4 is set to "Y", data card 92 are automatically erased after their data has been read. If this is "N", the Administrator must erase the cards himself one by one.

If more than one base unit 134 contributing data to a database, each unit must be assigned a different number. If two base units 134 configured with the same number, their data could conceivably "cancel each other out" in the database structure. Item 5 allows the data recovered by each base unit 134 be uniquely identified by a number in the range 1-99.

The above system configuration information is stored in a companion file to "ACCULOG.AMS", called "ACCULOG.DAT". If the file were lost, the program would force the operator to present an Administrator data key 88 and re-configure the system.

The PC-Compatible computer will document the following events on the base unit's tape printer 142:

When a data card 92's data has been successfully transferred into the PC compatible computer, this message is printed to the tape printer:
[date] [time]
Card Number [#] Data Posted.

When a data card 92 has been successfully erased, this message is logged:
[Date] [time]
Card Number [#] Erased During a data card 92 erasure, the date that the data card 92 battery was last changed is checked. If it was more than 24 months ago, this message is printed:
Change Battery in card [#]

Any error conditions that occurred in a field unit 74 will be detected after the data card 92 data has been transferred, and a message printed to the printer 142 for each one. They are as follows:
[date] [time]
Emergency Switch Used [#] Times
On Vehicle [#]

This is probably the most serious error. It indicates that a driver was unable to operate the system and had to override it. The seal wire on the emergency switch 190 must be replaced, and the cause of the problem remedied right away. Also, the data on the card may not be accurate.

When a field unit 74 detects the actuation of this switch, it does not try to complete the pickup. Instead, it gives up and saves what data it has and prepares for a new pickup. Thus, the driver must handwrite a receipt for the producer.
[date] [time]
Temperature Probe Error [#] Times
On Vehicle [#]

A field unit 74 can self-diagnose a problem with its temperature probe. If it reads −2.4 F. or cooler after the warmup period, an error is assumed to exist in the probe circuitry.

[date] [time]
Media error/Meter Probe Error [#] Times
On Vehicle [#]

A field unit 74 can detect when a Key or Card is removed while the unit is on. It can also detect a missing pulse in the meter probe 124. Unfortunately, it cannot distinguish between the two types of errors. Both are reported here, though.

[date] [time]
Field Unit Battery Requires Service
On Vehicle [#]

Base and field units 134 and 74 have two on-board batteries, a clock battery and a battery to preserve its program memory. The clock battery should be changes every 2-3 years, preferably by AMS personnel. They memory back-up battery should last 5-10 years and must be changed at AMS because the program must be restored. No notice is provided to forewarn its expiration.

In addition to the above general hardware failures, the system will also report errors that occurred at an individual pickup. These are documented below:

[date] [time]
Power Failure While Pumping [#] Times
On Vehicle [#] at Producer [#]

This error is generated if the driver switches off the power switch 192 while the pump 24 is running, since this action can affect the accuracy of the metered quantity.

[date] [time]
Incomplete Producer [#] Times
On Vehicle [#] at Producer [#]

If a driver tries to begin a pickup with one Producer data key, then he tries to continue with a different Producer key, the field unit 74 will flag the event and not let him get away with it. In fact, he will have to return to the previous producer and complete it before he will be allowed to continue his route.

[date] [time]
Temperature Override [#] Times
On Vehicle [#] at Producer [#]

If a producer's milk temperature exceeds the allowable maximum, the driver must enter the override code to continue. He should, in theory, have to call in to his supervisor to get the code. Regardless, if the temperature violation is overridden, the event will be recorded and reported here.

[date] [time]
General Override [#] Times
On Vehicle [#] at Producer [#]

Whenever the override code is used to force a field unit 74 to accept a keypad 80 input that is out of range, it will be noted here.

If one of the two above messages is displayed, that means that the driver knows the override code of the specified field unit 74. To remind the administrator that the code should be changed, the following message is displayed:

Change Override Code on Vehicle [#]

DATA STORAGE FORMATS

When data is received through a base unit and into the PC-compatible computer, it is appended to two files: DAILY1.AMS and DAILY2.AMS. Two separate files are used because there are two data structures involved. The first is the route information: Route number, driver number, vehicle number, etc. This data structure is stored as a record in DAILY1.AMS. The second data structure is the pickup information. A data card 92 only produces one record in DAILY1.AMS, but several records are stored in DAILY2.AMS, one for each stop the driver made. Each record is separated by a carriage return. The individual fields of the records of both structures are described below with a sample record of each.

DAILY1.AMS

```
05098811593401 05/08/8805/02/8801:14:25    101 80000    41
|    1     ||  2  ||    3    ||     4    ||  5  ||  6  || 7 |

05/02/8801:15:25 80500  228.0   801   125  901  200    4
|  8    ||  9  ||  10  ||  11  || 12  || 13  || 14 || 15 || 16 |
```

Field 1 is 14 characters long. It is merely the date, time and base unit number where the card was read (mmddyyhhmmssbb). This is also the first field of each record in the second database. The sole purpose of this record is to provide a relational link between a route record in DAILY1.AMS and all of its associated pickup records in DAILY2.AMS.

Field 2 is 8 characters long and contains the date the card data was posted.

Field 3 is 8 characters long and contains the date the route was begun.

Field 4 is 8 characters long and contains the time at the route's beginning.

Field 5 is 6 characters long and contains the vehicle number.

Field 6 is 6 characters long and contains the vehicle mileage at the beginning of the route.

Field 7 is 6 characters long and contains the driver number.

Field 8 is 8 characters long and contains the ending date of the route.

Field 9 is 8 characters long and contains the ending time of the route.

Field 10 is 6 characters long and contains the ending vehicle mileage.

Field 11 is 7 characters long and contains the total manifest for the route, in whatever units are specified in the Configuration Menu.

Field 12 is 6 characters long and contains the plant number that the milk was off-loaded to.

Field 13 is 6 characters long and contains the number of this route.

Field 14 is 6 characters long and contains the bay number into which the milk was off-loaded.

Field 15 is 6 characters long and contains the Hardware Error word for the route. Errors that occurred on this route are documented here.

Field 16 is 3 characters long and contains the number of pickups made on this route. This is also the number of records in DAILY2.AMS related to this route.

DAILY2.AMS

```
05088811593401 05/02/8801:14:4801:14:12 80100    102  11.6
|    1     ||  2  ||    3    ||    4    ||   5  || 6  || 7 |

0.0 0.0   102 51.31 1458.0    0
                                | 8 || 9 ||  10  ||  11  || 12 || 13 |
```

Field 1 is 14 characters long and contains the relational link between this record and its parent route record in DAILY1.AMS.

Field 2 is 8 characters long and contains the date this pickup began.

Field 3 is 8 characters long and contains the time this pickup began.

Field 4 is 8 characters long and contains the time this pickup ended.

Field 5 is 6 characters long and contains the vehicle mileage at this pickup.

Field 6 is 6 characters long and contains the producer number.

Field 7 is 7 characters long and contains the volume of milk received, in whatever units are specified in the Configuration Menu of the program.

Field 8 is 4 characters long and contains the maximum milk temperature recorded for this pickup, in whatever units are specified in the Configuration Menu of the program.

Field 9 is 4 characters long and contains the average milk temperature recorded for this pickup, again in the specified units.

Field 10 is 7 characters long and contains the vial number of the collected milk sample for this pickup.

Field 11 is 6 characters long and contains the stick reading the driver keyed in for this pickup. If this data was not collected, then this field will be zero.

Field 12 is 7 characters long and contains the stick volume the driver keyed in for this pickup.

Field 13 is 6 characters long and contains the Error Word for this pickup. It will document any errors trapped by the Field Unit that occurred during this pickup.

A database has been set up which will directly read the files DAILY1.AMS and DAILY2.AMS, append them to the database files, and delete DAILY1.AMS and DAILY2.AMS (so that duplicate data is not appended to the database). Furthermore, several canned reports can be generated and others easily written.

The database is written in DBase III Plus, which runs on all PC compatible computers. It can also be written in other database management programs such as R base.

If the formats of DAILY1.AMS and DAILY2.AMS are not compatible with a dairy's existing database structure, an intermediate program must be written and run to modify the structure of DAILY1.AMS and DAILY2.AMS to be compatible with the desired structure.

Flow charts of the programs and subroutines carried out by the computers 106 and 136 are set forth in FIGS. 8-31 and are, for the most part, self-explanatory when taken with the above descriptions of system operations. Accordingly, further description of the programs represented by the flow chart is not repeated here.

From the foregoing description, it will be apparent that the flow-meter data collection and processing system of the present invention has a number of advantages, some of which have been described above and others of which are inherent in the invention.

Also, it will be apparent that modifications can be made to the flow-meter data collection and processing system of the present invention without departing from the teachings of the invention.

Accordingly, the scope of the invention is only to be limited as necessitated by the accompanying claims.

I claim:

1. A flow-meter data collection and processing system for use in the collection of liquid at different times and/or locations including: a flow meter; means coupled to said flow meter for supplying liquid to said flow meter; electrical circuitry coupled to said flow meter for operating said flow meter; and control circuit means for controlling said electrical circuitry, said control circuit means including processing means, coded actuating means including at least one separate, detachable memory device with identification data therein for controlling actuation of said processing means, means coupled to said processing means for reading the separate, detachable memory device, and data collection means for collecting flow meter data, operator data and operator inputted data from said processing means; and said electrical circuitry including liquid temperature sensing means.

2. A flow-meter data collection and processing system for use in the collection of liquid at different times and/or locations including: a flow meter; means coupled to said flow meter for supplying liquid to said flow meter; electrical circuitry coupled to said flow meter for operating said flow meter; and control circuit means for controlling said electrical circuitry, said control circuit means including processing means, coded actuating means including at least one separate, detachable memory device with identification data therein for controlling actuation of said processing means, said separate, detachable memory device including a separate memory key means coupled to said processing means for reading the separate, detachable memory device, said means for reading said separate memory device including a memory key receptacle and data collection means for collecting flow meter data, operator data and operator inputted data from said processing means.

3. The system of claim 2 wherein said separate memory key is an EEPROM key.

4. A flow-meter data collection and processing system for use in the collection of liquid at different times and/or locations including: a flow meter; means coupled to said flow meter for supplying liquid to said flow meter; electrical circuitry coupled to said flow meter for operating said flow meter; and control circuit means for controlling said electrical circuitry, said control circuit means including processing means, coded actuating means including at least one separate, detachable memory device with identification data therein for controlling actuation of said processing means, means coupled to said processing means for reading the separate, detachable memory device, and data collection means for collecting flow meter data, operator data and operator inputted data from said processing means, said data collection means including a pluggable RAM card.

5. A flow-meter data collection and processing system for use in the collection of liquid at different times and/or locations including: a flow meter; means coupled to said flow meter for supplying liquid to said flow meter; electrical circuitry coupled to said flow meter for operating said flow meter; and control circuit means for controlling said electrical circuitry, said control circuit means including processing means, coded actuating means including at least one separate, detachable memory device with identification data therein for controlling actuation of said processing means, means coupled to said processing means for reading the separate, detachable memory device, and data collection means for collecting flow meter data, operator data and operator inputted data from said processing means; said processing means including means for polling said separate, detachable memory device and, in response to correct code input, for initiating operation of said electrical circuitry for causing said flow meter to measure the quantity of liquid pumped therethrough in one pumping operation.

6. The system of claim 5 wherein said processing means further includes means for reading the output data of said flow meter and for storing said data in said data collection means.

7. A flow-meter data collection and processing system for use in the collection of liquid at different times and/or locations including: a flow meter; means coupled to said flow meter for supplying liquid to said flow meter; electrical circuitry coupled to said flow meter for operating said flow meter; and control circuit means for controlling said electrical circuitry, said control circuit means including processing means, coded actuating means including at least one separate, detachable memory device with identification data therein for controlling actuation of said processing means, means coupled to said processing means for reading the separate, detachable memory device, and data collection means for collecting flow meter data, operator data and operator inputted data from said processing means, operator prompting means and keyboard input means for inputting operator response to an operator prompt.

8. A flow-meter data collection and processing system for use in the collection of liquid at different times and/or locations including: a flow meter; means coupled to said flow meter for supplying liquid to said flow meter; electrical circuitry coupled to said flow meter for operating said flow meter; and control circuit means for controlling said electrical circuitry, said control circuit means including processing means, coded actuating means including at least one separate, detachable memory device with identification data therein for controlling actuation of said processing means, said coded actuating means including a separate, detachable memory device containing operator identification means, additional separate memory devices, one each for each liquid supplier, each additional separate memory device containing liquid supplier identification means, means coupled to said processing means for reading the separate, detachable memory device, and data collection means for collecting flow meter data, operator data and operator inputted data from said processing means.

9. A flow-meter data collection and processing system for use in the collection of liquid at different times and/or locations including: a flow meter; means coupled to said flow meter for supplying liquid to said flow meter; electrical circuitry coupled to said flow meter for operating said flow meter; and control circuit means for controlling said electrical circuitry, said control circuit means including processing means, coded actuating means including at least one separate, detachable memory device with identification data therein for controlling actuation of said processing means, means coupled to said processing means for reading the separate, detachable memory device, and data collection means for collecting flow meter data, operator data and operator inputted data from said processing means; and data processing means, said data collection means being connectable to said data processing means.

10. A flow-meter data collection and processing system for use in the collection of liquid at different times and/or locations including: a flow meter; means coupled to said flow meter for supplying liquid to said flow meter; electrical circuitry coupled to said flow meter for operating said flow meter; and control circuit means for controlling said electrical circuitry, said control circuit means including processing means, coded actuating means including at least one separate, detachable memory device with identification data therein for controlling actuation of said processing means, means coupled to said processing means for reading the separate, detachable memory device, and data collection means for collecting flow meter data, operator data and operator inputted data from said processing means; said system being combined with a tank truck and said control circuit means including an on-board programmable controller.

11. The system of claim 10 combined with an off-board data processing means.

12. The system of claim 10 wherein said data collection means include a pluggable RAM which can be unplugged from said on-board controller and plugged into said off-board data processing means.

13. The system of claim 10 including a printer coupled to said data processing means.

14. The system of claim 10 including a printer mounted on said tank truck and coupled to said on-board controller.

15. A flow-meter data collection and processing system for use in the collection of liquid at different times and/or locations including: a flow meter; means coupled to said flow meter for supplying liquid to said flow meter; electrical circuitry coupled to said flow meter for operating said flow meter; and control circuit means for controlling said electrical circuitry, said control circuit means including processing means, coded actuating means including at least one separate, detachable memory device with identification data therein for controlling actuation of said processing means and a separate, detachable memory device for each liquid supplier with each separate, detachable memory device having liquid supplier identification information therein, means coupled to said processing means for reading said separate, detachable memory devices, and data collection means for collecting flow meter data, operator data and operator inputted data from said processing means.

16. The system of claim 15 wherein each liquid supplier memory device has free memory for receiving and storing data from said processing means.

17. The system of claim 16 wherein said processing means is operable, after a supply of liquid has been collected from a liquid supplier and the liquid supplier separate memory device is received in said reading means, to place, in said free memory in said memory device, information regarding the volume of liquid just collected from that liquid supplier.

18. The system of claim 17 wherein said processing means is operable to read the last stored volume data in the free memory in each supplier's memory device relating to the volume of liquid last picked up from that liquid supplier when that liquid suppliers memory device is next inserted into said means for reading said memory devices and, in response to that volume data, to program a sampler for taking a sufficient number of samples of liquid to fill a sample container as the liquid is being picked up from that liquid supplier and with the incremental sample portions being taken from the liquid being picked up throughout the complete pickup period of liquid from the liquid supplier whereby a sufficient amount of liquid sample is picked up from the volume of liquid expected to be received from the supplier based on the last volume picked up from that supplier and whereby the sampling is performed throughout the total volume of liquid supplied thereby to provide a total sample which is representative of all the liquid picked up from the supplier.

19. A flow-meter data collection and processing system for use in the collection of liquid at different times and/or locations including: a flow meter; means coupled to said flow meter for supplying liquid to said flow meter; electrical circuitry coupled to said flow meter for operating said flow meter; and control circuit means for controlling said electrical circuitry, said control circuit means including processing means, coded actuating means including at least one separate, detachable memory device with identification data therein for controlling actuation of said processing means, means coupled to said processing means for reading the separate, detachable memory device, and data collection means for collecting flow meter data, operator data and operator inputted data from said processing means said data collection means comprising a separate, detachable memory device.

20. A method for collecting and processing data received from a fluid pickup system using a processor system, said method including the steps of:
    (a) providing processing means;
    (b) identifying with an operator, separate, detachable memory device the operator who is picking up or delivering the fluid to the processor means;
    (c) identifying with a supplier separate, detachable memory device each supplier of fluid to the processor system;
    (d) providing free memory in each liquid supplier separate, detachable memory device;
    (e) determining if the fluid being picked up meets certain criteria; and
    (f) determining from the liquid supplier separate, detachable memory device the source of the fluid.

21. The method of claim 20 including the step of placing, after a supply of liquid has been collected from a liquid supplier and the liquid supplier memory device is received in said reading means, in said free memory in said memory device information regarding the volume of liquid just collected from that liquid supplier.

22. The method of claim 21 including the step of reading, including the step of reading, after a liquid supplier memory device is inserted in the reading means, the last stored volume data in the free memory in that supplier's memory device relating to the volume of liquid last picked up from that liquid supplier and, in response to that volume data, programming a sampler for taking a sufficient number of samples of liquid to fill a sample container as the liquid is being picked up from that liquid supplier, taking the incremental sample portions from the liquid being picked up throughout the complete pickup period of liquid from the liquid supplier whereby a sufficient amount of liquid sample is picked up from the volume of liquid expected to be received from the supplier based on the last volume picked up from that supplier and whereby the sampling is performed throughout the total volume of liquid supplied thereby to provide a total sample which is representative of all the liquid picked up from the supplier.

23. An apparatus including a processor system for collecting and processing data received from a fluid pickup system using said processor system, said apparatus including:
    (a) processing means;
    (b) means including an operator, separate, detachable memory device for identifying the operator, who is picking up the fluid to said processor means;
    (c) means including a liquid supplier, separate, detachable memory device for identifying each supplier of fluid to said processor means with each liquid supplier, separate, detachable memory device having free memory therein for receiving and storing data from said processing means;
    (d) means for receiving the memory device and for reading the identifying information in the memory device and for supplying the identifying information to the processing means;
    (e) means associated with the processing means for determining if the fluid being picked up meets certain criteria; and
    (f) means including the processing means, the liquid supplier separate, detachable memory device and the reading means for determining the source of the fluid.

24. The apparatus of claim 23 wherein said processing means is operable, after a supply of liquid has been collected from a liquid supplier and the liquid supplier memory device is received in said reading means, to place, in said free memory in said memory device, information regarding the volume of liquid collected from that liquid supplier.

25. The apparatus of claim 24 wherein said processing means is operable to read the last stored volume data in the free memory in each supplier's memory device relating to the volume of liquid last picked up from that liquid supplier when that liquid suppliers memory device is inserted into said means for reading said memory devices and, in response to that volume data, to program a sampler for taking a sufficient number of samples of liquid to fill a sample container as the liquid is being picked up from that liquid supplier and with the incremental sample portions being taken from the liquid being picked up throughout the complete pickup period of liquid from the liquid supplier whereby a sufficient amount of liquid sample is picked up from the volume of liquid expected to be received from the supplier based on the last volume picked up from that supplier and whereby the sampling is performed throughout the total volume of liquid supplied thereby to provide a total sample which is representative of all the liquid picked up from the supplier.

* * * * *